United States Patent [19]

Zwemer et al.

[11] Patent Number: 5,835,223
[45] Date of Patent: Nov. 10, 1998

US005835223A

[54] SYSTEM FOR MEASURING SURFACE FLATNESS USING SHADOW MOIRÉ TECHNOLOGY

[75] Inventors: Dirk A. Zwemer; Patrick B. Hassell, both of Atlanta, Ga.

[73] Assignee: Electronic Packaging Services, Ltd., Atlanta, Ga.

[21] Appl. No.: 778,214

[22] Filed: Dec. 30, 1996

Related U.S. Application Data

[60] Provisional application No. 60/009,637 Jan. 5, 1996.
[51] Int. Cl.$^6$ ........................... G01B 11/30; G01B 11/00; G01N 21/00
[52] U.S. Cl. ........................... 356/371; 356/390; 356/237; 250/237 G; 250/559.39; 250/559.46; 364/556; 364/570; 382/149
[58] Field of Search ................................... 356/374, 376, 356/237, 37.1, 394; 250/237 G, 559.39, 559.46; 364/556, 570; 382/145, 147, 149, 154, 203

[56] References Cited

U.S. PATENT DOCUMENTS

| | | | |
|---|---|---|---|
| 4,025,195 | 5/1977 | Ebersole et al. | |
| 5,307,152 | 4/1994 | Boehnlein et al. | 356/376 |
| 5,309,222 | 5/1994 | Kamei et al. | 356/376 |
| 5,345,514 | 9/1994 | Mahdavieh et al. | 324/240 |
| 5,581,632 | 12/1996 | Koljonen et al. | 382/150 |
| 5,583,632 | 12/1996 | Haga | 356/371 |
| 5,601,364 | 2/1997 | Ume | 356/374 |

FOREIGN PATENT DOCUMENTS 1-013406  1/1989  Japan.

OTHER PUBLICATIONS

Letter dated Sep. 8, 1995 from Dirk Zwemer, an inventor for the present applicaiton, to Mr. Rich Newman.
John L. Sullivan, "Phase–Stepped Fractional Moiré," Dec. 1991, Experimental Mechanics, pp. 373–381.

M. Chang et al., "Phase–Measuring Profilometry Using Sinusoidal Grating," Jun. 1993, Experimental Mechanics, pp. 117–122.

Bill Foran et al., "Measurement/Prediction of Board Warpage," Circuits Assembly, Jun., 1995.

Chiu–Ching Tsang et al., "Real Time Measurement of Printed Wiring Board Flatness in a Simulated Manufacturing Environment," Believed to be known . . . by others within the meaning of 35 U.S.C. § 102 (a) before Dec. 30, 1996, Georgia Institute of Technology publication.

Brochure describing Series 800 System provided by Dickerson Vision Technologies of Atlanta, Georgia, Believed to be known . . . by others within the meaning of 35 U.S.C. § 102 (a) before Dec. 30, 1996.

*Primary Examiner*—Frank G. Font
*Assistant Examiner*—Jason D. Vierra-Eisenberg
*Attorney, Agent, or Firm*—Jones & Askew, LLP

[57] ABSTRACT

A system for measuring surface characteristics of an electronic interconnection component, such as a printed circuit board, by analyzing shadow moiré patterns. Printed circuit boards are carried on a continuous conveyor under a grating. For each printed circuit board, a shadow moiré fringe pattern is created in response to a determination that the printed circuit board is properly located under a grating and within the field of view of a camera. Fringes of the shadow moiré fringe pattern are quantified over one or a multiple of analysis paths to determining if the printed circuit board is unacceptably warped, in which case a signal is generated. For each printed circuit board, multiple images can be captured and mathematically combined, by image subtraction, to produce an enhanced shadow moiré fringe pattern that is analyzed for warpage.

26 Claims, 13 Drawing Sheets

SYSTEM FOR MEASURING SURFACE FLATNESS USING SHADOW MOIRÉ TECHNOLOGY

RELATED APPLICATION

This application claims the benefit of U.S. provisional application Ser. No. 60/009,637, filed Jan. 5, 1996, and assigned to the assignee for the present application.

FIELD OF THE INVENTION

This invention relates generally to a system for distinguishing between planar and non-planar surfaces, and more particularly to utilizing shadow moiré techniques to analyze the surface characteristics of electrical interconnection components, such as printed circuit boards.

BACKGROUND OF THE INVENTION

The manufacture of printed circuit boards and other electronic interconnection products is a multi-billion dollar global industry. The flatness of these products is critical to their ability to undergo further manufacturing steps and to their ultimate reliability in operation as parts of computers, automobiles, and other electronic systems. Non-flatness or warpage, however, is a typical problem in manufacturing due to inadequacies in design and processing of electronic interconnection products, such as printed circuit boards, which are typically complex devices comprising several different materials.

There are three primary existing techniques for obtaining warpage measurements for printed circuit boards in the electronics packaging industry. In accordance with a first prior technique, manual measurements are made by placing a printed circuit board on a flat reference surface and measuring any gap between the reference surface and the bottom of the printed circuit board with a feeler gauge. This method requires a human operator, is slow, and is strongly dependent on the operator's skill.

For a second prior technique, a printed circuit board is profiled by use of a sensor, which is physically scanned over the surface of a printed circuit board that lies on a flat reference surface. The sensor measures the height of the top surface of the printed circuit board above the reference and can work by either contact or non-contact sensing of the top surface. This method is relatively slow because the sensor can only measure a single point on the printed circuit board surface at a time and a large number of samples must be taken to establish a surface profile of adequate resolution to establish warpage.

For a third prior technique, a printed circuit board, lying flat, is conveyed via a conveyer under a beam of light. If the printed circuit board is sufficiently warped to interrupt the light beam, it is rejected. A similar technique is based on a physical barrier, which prevents the printed circuit board from passing for further assembly operation if the printed circuit board is unable to pass under a barrier set a fixed distance above the conveyor surface. These techniques provide no quantitative information on the warpage of the printed circuit board, they are less sensitive to local regions of high warpage, and they are reported to be prone to errors due to printed circuit board movement during transport.

Shadow moiré measurement techniques are well known in the field of photomechanics and have been applied previously to the measurement of warpage in printed circuit boards and other electronic packaging components. For example, when a printed circuit board is viewed through a grating and a shadow of the grating is cast upon the surface of the printed circuit board, the shadow and the grating can interact to create a shadow moiré fringe pattern that is indicative of the warpage of the surface of the printed circuit board. For example, shadow moiré measurement techniques have been utilized to create three-dimensional images of printed circuit boards. A prior three-dimensional imaging system 30 is schematically depicted in FIG. 1. The prior imaging system 30 includes a grating 32 that is suspended above a generally stationary printed circuit board 34. The grating 32 is a generally planar plate of translucent material 36 that includes multiple parallel and evenly spaced opaque lines 38 extending across a surface of the plate. The grating 32 and the printed circuit board 34 are generally parallel to one another. A light 48 illuminates the grating 32 and the printed circuit board 34 at an oblique angle of incidence "A", as represented by arrow 50. The light projects a shadow of the grating 32 (i.e., a shadow of the opaque lines 38) upon the printed circuit board 34. A charged couple device camera 52 views the grating 32, printed circuit board 34, and the shadow cast upon the printed circuit board 34, as indicated by arrow 54. The camera 52 views the printed circuit board 34 and the shadows thereon through the grating 32. If the printed circuit board 34 is warped, the interaction between the shadow cast on the printed circuit board 34 and the grating 32 causes the image received by the camera 52 to include a shadow moiré fringe pattern that is indicative of the warpage. The printed circuit board 34 is held in place by a stationary support structure during the period in which the camera 52 receives the image.

FIG. 2 is a schematic view of an exemplary shadow moiré fringe pattern 54 that could have been received by the camera 52 (FIG. 1) in the above-described circumstances. The shadow moiré fringe pattern 54 is indicative of the warpage of the printed circuit board 34 (FIG. 1). In FIG. 2, each of the dark and light regions is considered to be a moiré half-fringe 56. Only a few of the moiré half-fringes 56 are specifically pointed out in FIG. 2 in an effort to clarify the view. If the printed circuit board 34 was characterized by a planar surface, there would be only a few, wide half-fringes 56 in the shadow moiré fringe pattern 54. Because the printed circuit board 34 is warped (i.e., the surface 35 (FIG. 1) of the printed circuit board 34 is distorted and not parallel to the grating 32), the shadow moiré fringe pattern 54 includes a series of closely spaced, narrow dark half-fringes 56 and light half-fringes 56. In general, the greater the warpage of the printed circuit board 34, the larger the number of half-fringes 56.

Referring to FIGS. 1 and 2, shadow moiré fringe patterns 54 can be used to determine elevational differences between two points on a surface in a manner that is analogous to determining elevational differences on a contour map. For example, the elevational difference between a first point on the surface 35 of the printed circuit board 34 and a second point on the surface 35 is a function of the number of moiré half-fringes 56 that are defined between those two points, the pitch of the grating 32, and the incident angles of the camera 52 and the light source 48 with respect to the surface 35.

The prior imaging system 30 further includes a computer 58 that is connected to the camera 52 and digitizes the image of the shadow moiré fringe pattern 54 captured by the camera 52. The computer 58 processes the image to assist in the creation of a three-dimensional representation of the printed circuit board 34, with resolutions typically in the thousandths of an inch. The three-dimensional image can be viewed on a monitor 60 that is connected to the computer 58. While shadow moiré fringe patterns 54 can be used to determine detailed three-dimensional profiles of printed circuit boards 34, this analysis requires capturing several images, extensive computer calculations, and (in practice) some human intervention. Therefore, such an analysis is difficult to conduct at production line speeds, typically on the order of one printed circuit board per second. This analysis also experiences some difficulty when the analyzed surface includes contrasting patterns, such as those that are characteristic to printed circuit boards. For example, the surface of a printed circuit board typically includes both reflective metallic portions and other less reflective portions. Therefore, it is common to spray a printed circuit board with a coating of white paint prior to obtaining a shadow moiré image of the printed circuit board. However, one will appreciate that it is undesirable to spray paint printed circuit boards while they are on their production line.

In view of the shortcomings of prior techniques for measuring the warpage of printed circuited boards there is a need for an improved method and apparatus for measuring the warpage of printed circuit boards.

SUMMARY OF THE INVENTION

The present invention provides a method and apparatus for measuring the surface flatness of objects such as printed circuit boards. More particularly, the present invention provides a method and apparatus for sequentially examining a plurality of printed circuit boards traveling on or downstream from a production line by rapidly creating, capturing, and evaluating images of shadow moiré fringe patterns. The present invention further provides a method and apparatus for arithmetically combining images to obtain a high contrast shadow moiré fringe pattern. Such high contrast patterns enhance the evaluation process.

In accordance with certain exemplary embodiments of the present invention, objects such as printed circuit boards are carried in sequence on a conveyor assembly under a grating. For each printed circuit board, a pulsed light source is used to create and a detector (e.g., camera) is used to capture an image of a shadow moiré fringe pattern. The shadow moiré fringe pattern is created by the interaction of the light, printed circuit board, and grating. The pulsed light source and camera are triggered when the printed circuit board is determined to be properly located under the grating and within the field of view of the camera. This determination is made, in part, by a sensor that senses the printed circuit board. The printed circuit board is preferably in motion on the conveyor while the shadow moiré fringe pattern is created and captured.

For each printed circuit board, the associated shadow moiré fringe pattern is digitized by a computer that analyzes the pattern and provides an indication as to whether or not the printed circuit board is unacceptably warped. More particularly, transitions between half-fringes of the shadow moiré fringe pattern are quantified (e.g., counted) over one or more analysis paths to determine a quantity relating to the number of moiré fringes that the paths cross. This quantity provides an indication of the flatness of the surface of the printed circuit board. The quantity is compared to a threshold to determine if the printed circuit board is unacceptably warped, and a signal is generated if it is determined that the printed circuit board is unacceptably warped.

In accordance with certain of the exemplary embodiments of the present invention, for each printed circuit board, a plurality of images are captured and mathematically combined to produce an enhanced shadow moiré fringe pattern. This enhancement seeks to negate the effect of contrasting patterns that are inherent to printed circuit boards and can in some cases interfere with the analyses of shadow moiré fringe patterns. The mathematical combining preferably includes image subtraction. Image subtraction is a method carried out by the computer which takes the digitized pixel values for two printed circuit board images, for example, one with moiré fringes and one without moiré fringes. By subtracting one set of digitized values from the other and creating a new image, the effect of permanent surface features is greatly reduced and the contrast of the moiré fringes is enhanced. Alternately, the polarity of a fringe pattern can be reversed by raising or lowering the grating a fixed distance. By subtracting an image with a shadow moiré fringe pattern from an image with the fringe pattern reversed in polarity, a high contrast fringe pattern can be obtained. This negates the effect of contrasting patterns that are inherent to printed circuit boards.

In accordance with one exemplary embodiment and numerous alternate embodiments of the present invention, a reel-to-reel tape transport system is used in place of the conveyer assembly discussed above, and an elongate flexible circuit traveling between the reels of the reel-to-reel tape transport system is analyzed for surface flatness generally in accordance with each of the methods discussed above.

Thus, it is an object of the present invention to provide an improved method and apparatus for measuring surface flatness.

Another object of the present invention is to provide a method and apparatus for measuring surface flatness of printed circuit boards on or down-stream from a production line.

Still another object of the present invention is to provide an automated method and apparatus for measuring warp across large production lots.

Still another object of the present invention is to diminish the need for preparing the surfaces of printed circuit boards prior to analyzing the warpage thereof.

Still another object of the present invention is to provide enhanced images of shadow moiré fringe patterns.

Still another object of the present invention is to provide a versatile system for analyzing the surface flatness of objects including printed circuit boards and continuous flexible circuits.

Still another object of the present invention is to enhance the performance of printed circuit boards and continuous flexible circuits.

Other objects, features, and advantages of the present invention will become apparent upon review of the following description of embodiments and the appended drawings and claims.

DETAILED DESCRIPTION

In accordance with exemplary embodiments of the present invention, objects such as electronic components are conveyed in sequence under a grating. For each object, a pulsed light source is used to create and a detector (e.g., camera) is used to capture an image of a shadow moiré fringe pattern. Each shadow moiré fringe pattern is digitized by a computer that quantifies fringes of the pattern and provides an indication of the surface flatness of the object associated with the pattern. In accordance with certain of the exemplary embodiments of the present invention, for each object, a plurality of images are captured and mathematically combined to produce an enhanced shadow moiré fringe pattern that is analyzed by the computer as discussed above.

The present invention provides for quick and automatic shadow moiré fringe analysis of objects such as printed circuit boards that are traveling on or down-stream from a production line. The present invention also seeks to enhance the analysis by enhancing images of shadow moiré fringe patterns in a manner that seeks to negate the detrimental effects of permanent surface features of the objects being analyzed.

Figure 1:
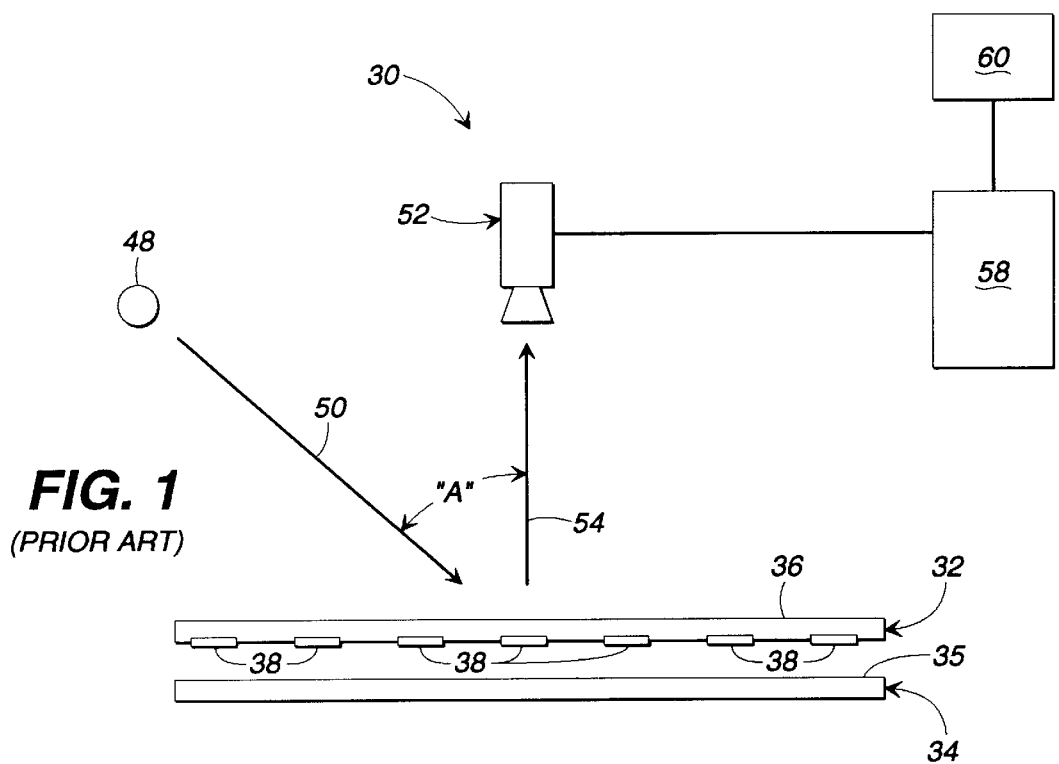
FIG. 1 is a schematic view of a prior art shadow moiré imaging system.
Figure 2:
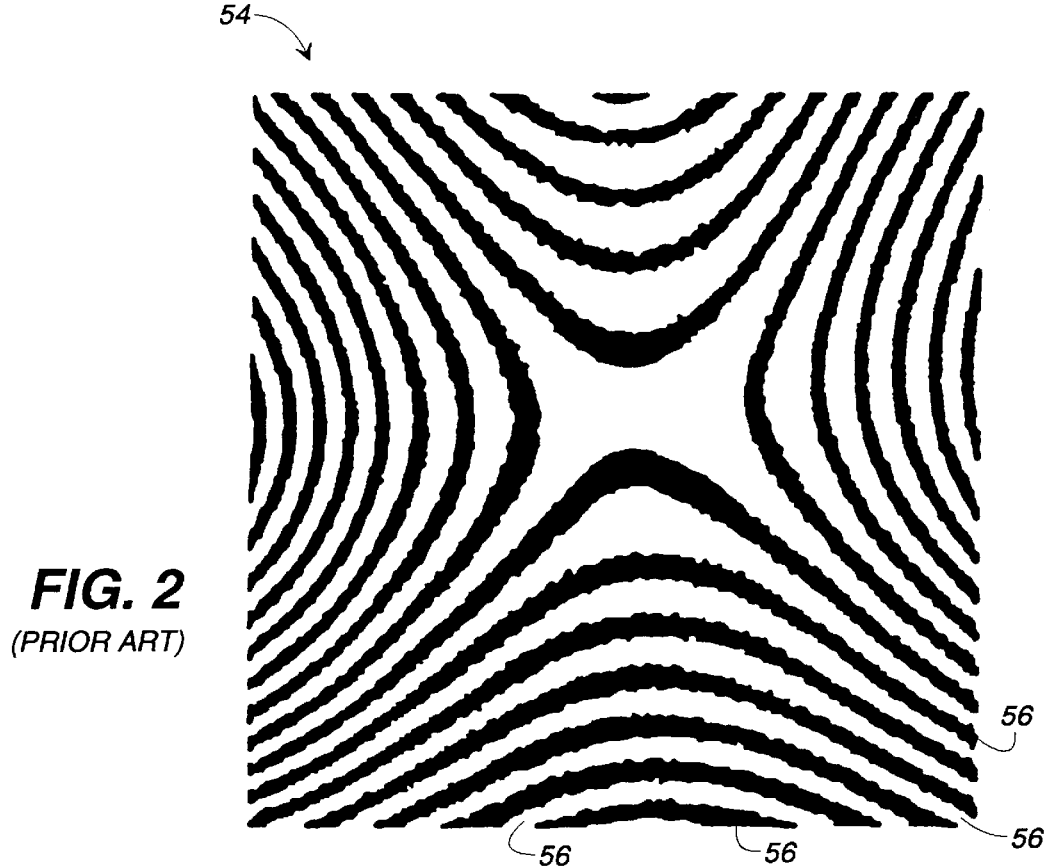
FIG. 2 is an illustration of a shadow moiré fringe pattern.

Turning now to the drawings in which like numbers reference like parts or steps in and the several figures, FIG. 1 is a schematic side view of a shadow moiré imaging system 70 in accordance with a first exemplary embodiment of the present invention. The imaging system 70 captures images of shadow moiré fringe patterns (e.g., see shadow moiré fringe pattern 54 of FIG. 2) and processes those images to determine if conveyed objects such as printed circuit boards 34 are unacceptably warped. More particularly, the imaging system 70 includes an imaging subsystem 90 suspended above a continuous belt 82 of a conveyor assembly 72. The conveyer assembly 72 sequentially conveys samples such as printed circuit boards 34 beneath the imaging subsystem 90. The imaging subsystem 90 captures shadow moiré fringe patterns that are representative of the surface characteristics of the printed circuit boards 34. A computer assembly 104 processes the shadow moiré fringe patterns and cooperates with a display assembly 106 to provide users of the imaging system 70 with an indication of whether or not individual printed circuit boards 34 are unacceptably warped. For each shadow moiré fringe pattern, software is executed by the computer assembly 104 that determines a quantity relating to the number of moiré half-fringes 56 (FIG. 2) defined in at least a region of the shadow moiré fringe pattern. The quantity provides an indication of surface flatness warpage.

The conveyor assembly 72 is preferably part of or just downstream from and contiguous to a production line 74 where printed circuit boards 34 are manufactured. The production line 74 preferably includes a production conveyor 76 that discharges printed circuit boards 34 directly onto the conveyor assembly 72 of the imaging system 70. The production line 74 and production conveyor 76 are partially cut away in FIG. 3 and similar figures. The conveyor assembly 72 includes a support frame 78 that supports rollers 80. The continuous belt 82 extends around the rollers 80. Printed circuit boards 34 travel with the upper surface of the conveyor belt 82 in the direction indicated by arrow 89. One of the rollers 80 is driven by a drive belt 84, or the like, that encircles an output shaft 86 of a drive motor 88 that is mounted to the support frame 78. In accordance with the exemplary embodiments of the present invention, the conveyer belt 82 is preferably continuously in motion at approximately a constant speed. For example, a printed circuit board 34 can be processed by the imaging system 70 approximately every second.

The imaging subsystem 90 is mounted to the support frame 78 and suspended above the belt 82 of the conveyor assembly 72. The conveyer assembly 72 sequentially conveys printed circuit boards 34 beneath the imaging subsystem 90. The imaging subsystem 90 includes a hood assembly 92 that defines and substantially encloses an internal chamber 94. The hood assembly 92 is positioned close to the upper surface of the belt 82 so that only small gaps 96 are defined between the hood assembly 92 and the upper surface of the belt 82. Therefore, the chamber 94 is substantially shielded from ambient light.

Figure 3:
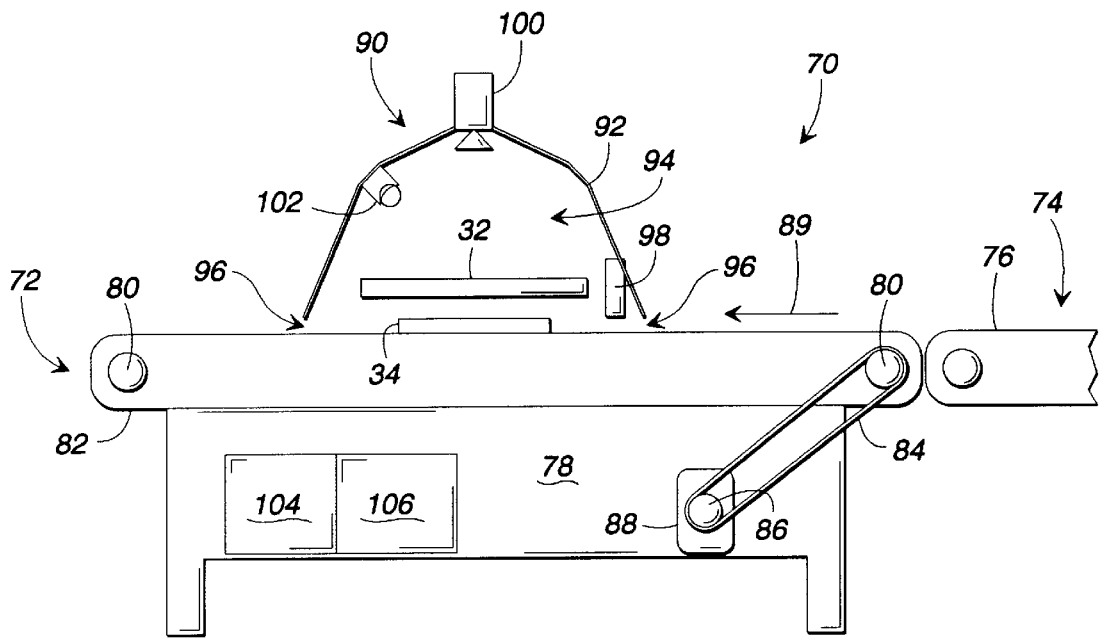
FIG. 3 is a schematic side view of a shadow moiré imaging system in accordance with a first exemplary embodiment of the present invention.

The imaging subsystem 90 further includes a sensor 98 that is connected to the hood assembly 92 and senses printed circuit boards 34 passing through the entry gap 96 and into the chamber 94. The imaging subsystem 90 further includes a detector 100 (e.g., charged coupled device camera) connected to the hood assembly 92 for viewing printed circuit boards 34 that are within the chamber 94. The imaging subsystem 90 further includes a light source 102 connected to the hood assembly 92 for illuminating the printed circuit board 34 that is within the chamber 94. In accordance with the first exemplary embodiment of the present invention, a grating 32 (also see grating 32 in FIG. 1) is disposed within the chamber 94 above the path of printed circuit boards 34 passing through the chamber 94. The light source 102 emits a flash of light that shines light through the grating 32 onto the printed circuit board 34 such that a shadow moiré fringe pattern (e.g., see shadow moiré fringe pattern 54 of FIG. 2) is defined. The defined shadow moiré fringe pattern is viewed and captured by the detector 100. When a printed circuit board 34 is positioned as depicted in FIGS. 3 and 4, the printed circuit board 34 is substantially shielded from ambient light by the hood assembly 92, and the circuit board 34 and the grating 32 are both within the field of view and the depth of field of the detector 100.

Figure 4:
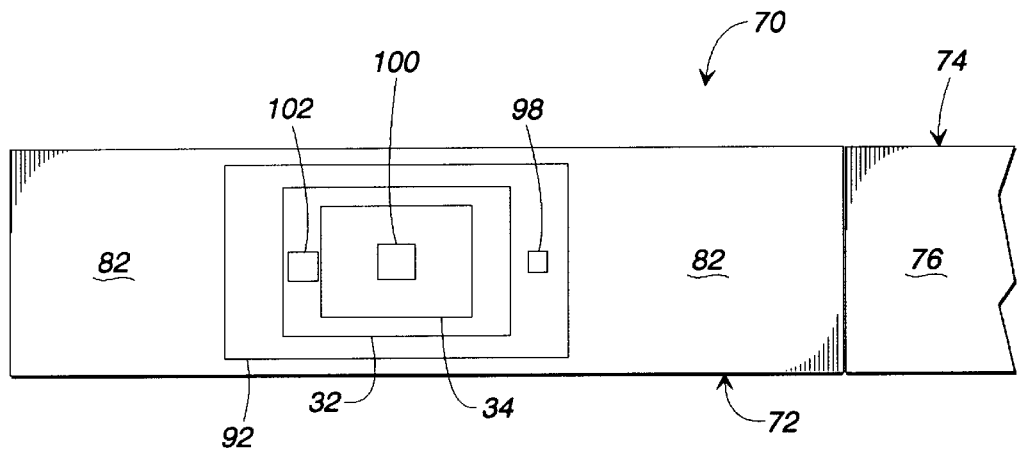
FIG. 4 is a schematic top view of the imaging system of FIG. 3
Figure 5:
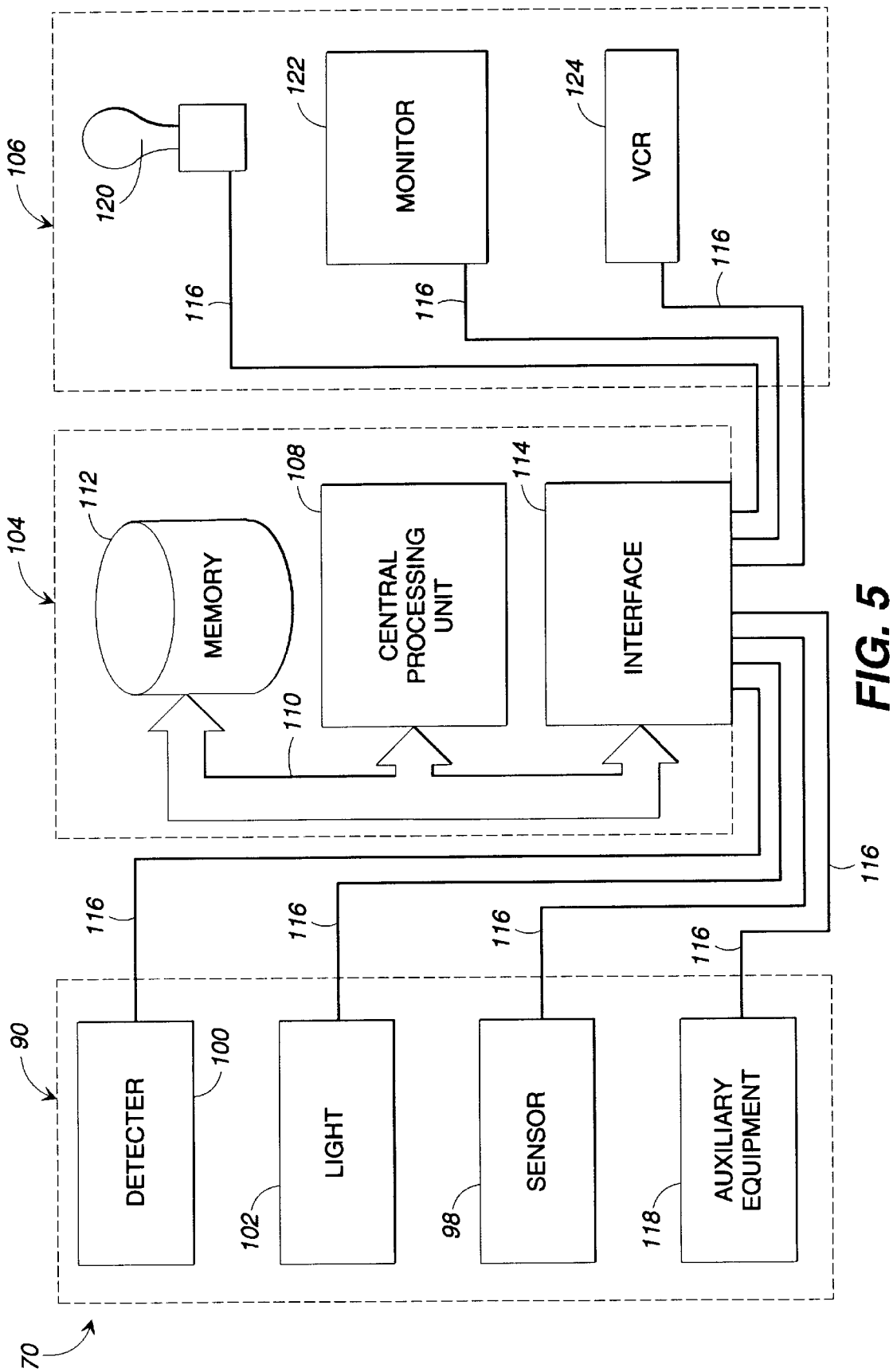
FIG. 5 is a block diagram of the imaging system of FIG. 3.

FIG. 4 is a schematic top view of the imaging system 70 of the first exemplary embodiment, wherein only the peripheries of select components of the imaging system 70 are shown so that the relative positions of those components can generally be discerned. FIG. 5 is a block diagram depicting select components of the imaging system 70 in accordance with the first exemplary embodiment of the present invention. As depicted in FIG. 5, the computer assembly 104 includes a central processing unit 108 that communicates by way of a bus 110 with a memory 112 and an interface 114. The interface 114 of the computer assembly 104 is connected by cables 116 to the detector 100, light 102, sensor 98, and any auxiliary equipment 118 of the imaging system 70. While no auxiliary equipment 118 is depicted in FIGS. 3 and 4, it should be understood that the imaging system 70 can be equipped with auxiliary equipment 118 to create alternative embodiments of the present invention. Additionally, the drive motor 88 (FIG. 3) could be considered and characterized as auxiliary equipment 118 that is connected to and controlled by the computer assembly 104.

The cables 116 also connect the interface 114 of the computer assembly 104 to an output light 120, a video monitor 122, and a video cassette recorder 124 of the display assembly 106. While the imaging system 70 is characterized as including a display assembly 106, the imaging system 70 can function properly without certain components of the display assembly 106. While the computer assembly 104 and display assembly 106 are depicted as mounted to the support frame 78 in FIG. 3, they can be mounted at various locations, such as remotely from the conveyor assembly 72 and the imaging subsystem 90.

Referring again to FIGS. 3 and 4, in accordance with the first exemplary embodiment of the present invention, the grating 32 is approximately two inches wider than the conveyor chain belt 82 and is supported along two opposite sides so that the belt 82 passes beneath it. The grating 32 is approximately 0.25 inches above and parallel to the top surface of the belt 82. The detector 100 is mounted directly above the grating 32, pointing down, and is approximately 3 feet from the grating 32. The opaque lines 38 (FIG. 1) of the grating 32 extend parallel to the plane of the top surface of the conveyer belt 82, and perpendicular to the direction of travel 89 of the printed circuit boards 34. The pulsed light source 102, as well as the below discussed pulsed light source 126 (FIGS. 8 and 9) illuminate the grating 32 at an angle of approximately forty-five degrees, and are each mounted approximately three feet from the grating 32. The hood assembly 92 is preferably a substantially light-tight enclosure of thin sheet metal, within which the printed circuit board 34, grating 32, detector 100, and light sources 102, 126 (FIGS. 8 and 9) are located. This prevents ambient light outside the hood assembly 92 from interfering with the formation of shadow moiré fringe patterns (e.g., see shadow moiré fringe pattern 54 of FIG. 2) and protects the user of the imaging system 70 from exposure to the high intensity light flashes from the light sources 102, 126. The only openings in the hood assembly 92 are the entry and exit gaps 96 which allow the printed circuit boards 34 to pass into and out of the chamber 94. For this embodiment, the gaps 96 (i.e., ports) are each approximately a quarter of an inch high and twelve inches wide.

The imaging system 70 is acceptably constructed from a series of commercially available components, as described below, although it is not limited to such specific components. Referring to FIG. 3, the detector 100 and the software, which is executed by the computer assembly 104 to "count" transitions between moiré half-fringes 56 (FIG. 2), are part of a Machine Vision System. The Machine Vision System can be the Series 820 optical sensor system from Dickerson Vision Technologies (Atlanta, Ga.). The Series 820 optical system (as well as other models of SmartImage optical sensor systems from Dickerson Vision Technologies) includes a "FRAMEWORK" software package that further includes a FeatureCount module. The present invention preferably employs a modified "FRAMEWORK" software package.

This system can be driven with an Intel 486-type microcomputer using the Windows operating system. The light source 102, as well as the below discussed light source 126 (FIGS. 8 and 9) are each pulsed light sources (i.e., strobe lamps), and each can be the MVS 62 Machine Vision Strobe with MVS 3007 power supply and triggering electronics, available from EG&G Optoelectronics (Salem, Mass.). The grating 32 can be a Ronchi-type grating with chromium oxide pattern and 100 lines per inch resolution, which can be obtained from Max Levy Autograph (Philadelphia, PA). A fourteen inch by fourteen inch square soda lime glass grating could be used. The conveyer assembly 72 can be a standard tabletop conveyor system with a twelve inch wide belt chain, and a DC motor 88 and reducer for 0 to 60 feet per minute belt speed. Such a system can be obtained from Hytrol (Manteca, Calif.). The sensor 98 can be a photoelectric sensor. Photoelectric sensors are standard components available from many vendors. The sensor could be a miniature diffuse reflectance photoelectric sensor from Honeywell MicroSwitch (Freeport, Ill.).

It will be understood that the present invention includes numerous exemplary embodiments. The components, arrangement and operation of the additional exemplary embodiments are generally identical to the components, arrangement and operation of the first exemplary embodiment, except for the differences noted herein and the differences that would be understood by one reasonably skilled in the art in light of this disclosure.

Figure 6:
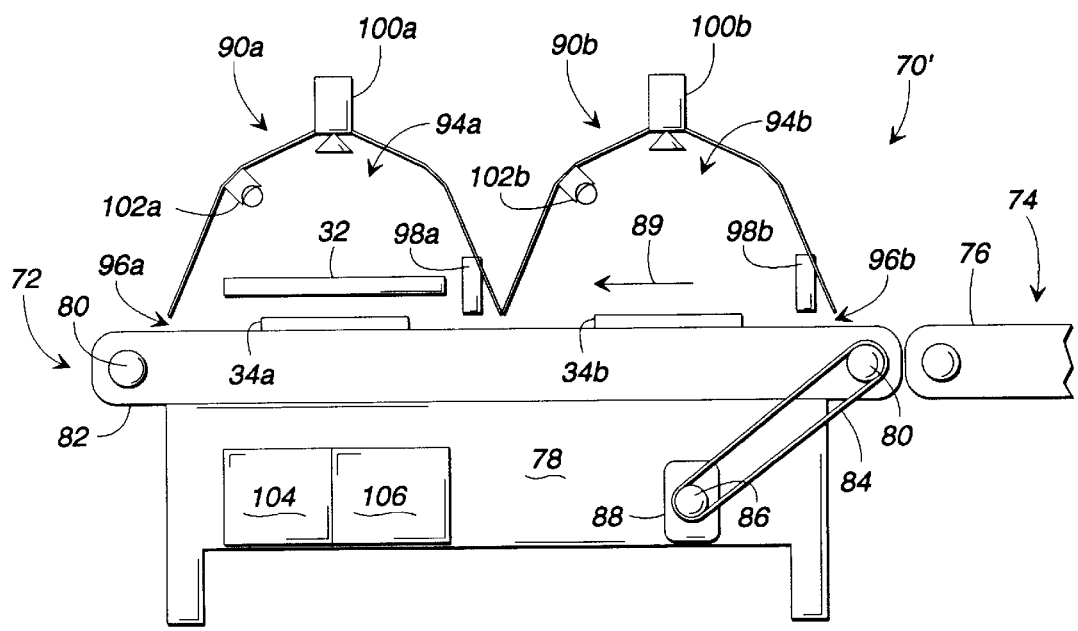
FIG. 6 is a schematic side view of a shadow moiré imaging system in accordance with a second exemplary embodiment of the present invention.
Figure 7:
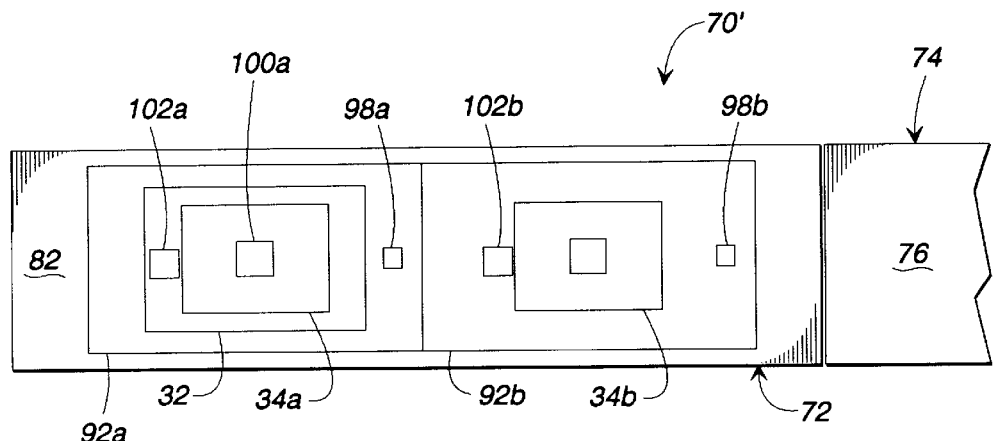
FIG. 7 is a schematic top view of the imaging system of FIG. 6.

FIG. 6 is a schematic side view of an imaging system 70' in accordance with a second exemplary embodiment of the present invention. FIG. 7 is a schematic top view of the imaging system 70' of the second exemplary embodiment, wherein only the peripheries of select components of the imaging system 70' are shown so that the relative positions of those components can generally be discerned. The imaging system 70' includes a first imaging subsystem 90a with a grating 32 suspended in the chamber 94 thereof, that functions in the same manner as the imaging subsystem 90 (FIG. 3) of the first exemplary embodiment to create and capture shadow moiré fringe patterns (e.g., see shadow moiré fringe pattern 54 of FIG. 2) that are representative of the surface flatness of printed circuit boards 34. In many printed circuit board 34 types of interest, the printed circuit board surface has a large number of contrasting optical features which interfere with the shadow moiré fringe pattern produced by the light 100a and grating 32. For example, printed circuit boards can have contrasting surface regions of red-gold copper, green solder mask, and white ink. In such cases, the combination of normal surface features and the superimposed shadow moiré fringe pattern can make it difficult to reliably "count" the number of transitions between half-fringes 56 (FIG. 2) and thereby quantifying warpage. One of the inventive aspects of the present invention is the enhancement of shadow moiré fringe patterns. This enhancement is carried out, for example, by arithmetically combining images. More particularly, this includes image subtraction, which compensates for contrasting optical features on the surface of printed circuit boards 34. Image subtraction is typically a software implemented or a computer implemented method which takes the digitized pixel values for two printed circuit board images, for example, one with moiré half-fringes 56 and one without moiré half-fringes 56. By subtracting one set of digitized values from the other and creating a new image, the effect of permanent surface features is greatly reduced and the contrast of the moiré half-fringes 56 is enhanced.

In order to facilitate the image subtraction, the imaging system 70' further includes an imaging subsystem 90b that is just upstream from the imaging subsystem 90a. A grating 32 is not disposed within the chamber 94b of the imaging subsystem 90b, so the image captured by the detector 100b includes a printed circuit board 34 without any grating 32 or shadow moiré fringe pattern (e.g., shadow moiré fringe pattern 54 (FIG. 2)). For each printed circuit board 34 processed by the imaging system 70', the imaging subsystem 90b captures a first image of that printed circuit board 34 and the imaging subsystem 90a captures a second image of the printed circuit board 34. The first image includes only the normal surface features of the printed circuit board 34 and the second image includes the normal surface features plus a shadow moiré fringe pattern. The computer 104 receives both the first image and the second image, and performs a matrix subtraction on the two images. This produces a resulting image which shows the shadow moiré fringe pattern with greatly reduced interference from the surface optical features of the printed circuit board 34. The resulting image is analyzed for warpage.

Figure 8:
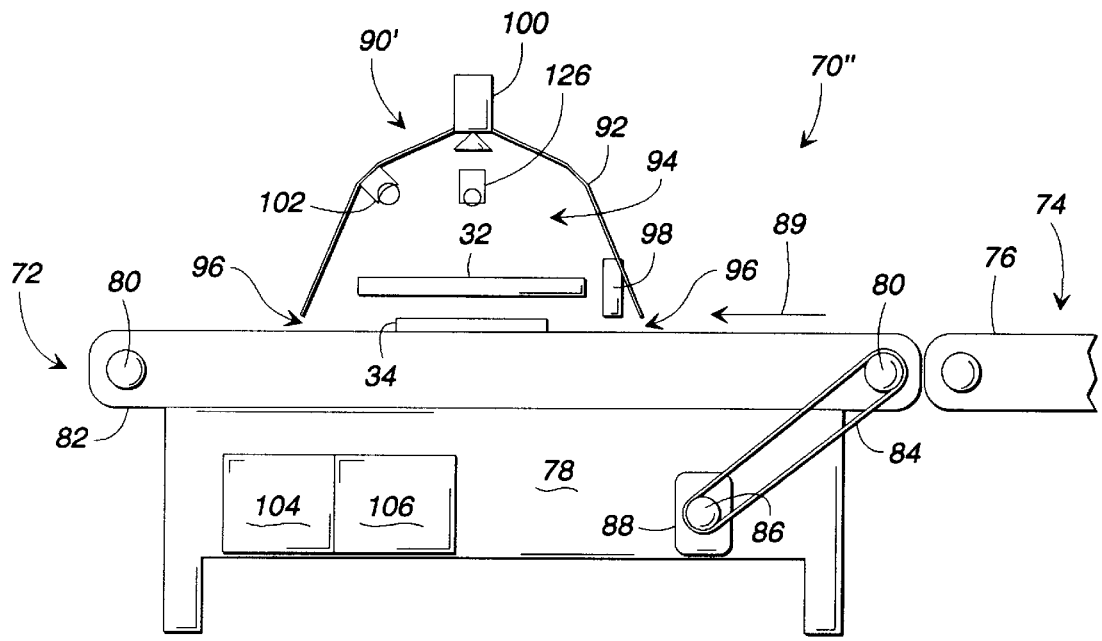
FIG. 8 is a schematic side view of a shadow moiré imaging system in accordance with a third exemplary embodiment of the present invention.
Figure 9:
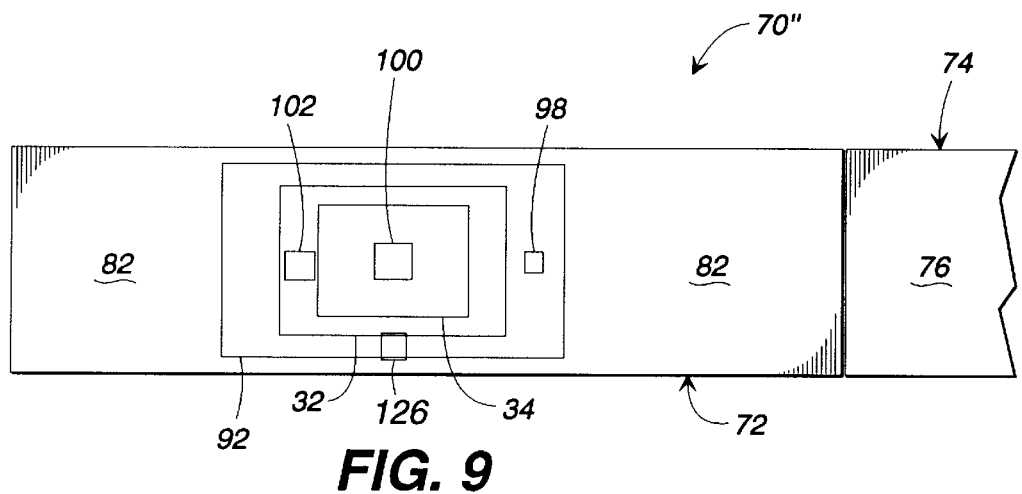
FIG. 9 is a schematic top view of the imaging system of FIG. 8.

FIG. 8 is a schematic side view of an imaging system 70" that carries out image subtraction and warpage analysis in accordance with a third exemplary embodiment of the present invention. FIG. 9 is a schematic top view of the imaging system 70" of the third exemplary embodiment, wherein only the peripheries of select components of the imaging system 70" are shown so that the relative positions of those components can generally be discerned. In this configuration, there is only one detector 100, but there are two light sources 102, 126. The second light source 126 is located ninety degrees around the grating 32 with respect to the first light source 102. For the second light source 126, the plane defined by the light path from the source 126 to the printed circuit board 34 and then to camera 100 is parallel to the lines 38 (FIG. 1) of the grating 32, so no moiré half-fringes 56 (FIG. 2) are generated by light from the source 126. In operation, the sensor 98 triggers a light pulse from the light source 126 and the detector 100 captures a first image that does not include a shadow moiré fringe pattern (e.g., shadow moiré fringe pattern 54 (FIG. 2)). After a very short preset delay, the light source 102 pulses and the detector 100 captures a second image that includes a shadow moiré fringe pattern. As in the second exemplary embodiment (FIGS. 6 and 7), the computer assembly 104 performs an arithmetic combining (e.g., image subtraction) of the first and second images which produces an image which shows a shadow moiré fringe pattern with greatly reduced interference from the surface optical features of the printed circuit board 34 being inspected. The resulting image is analyzed for warpage.

Figure 10:
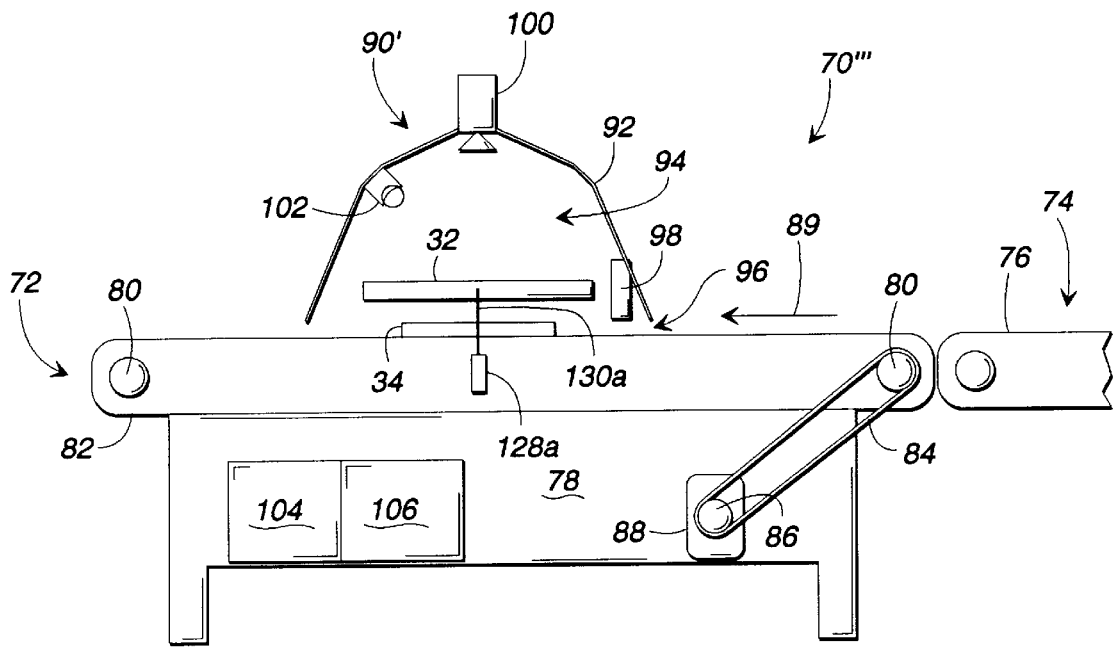
FIG. 10 is a schematic side view of a shadow moiré imaging system in accordance with a fourth exemplary embodiment of the present invention.
Figure 11:
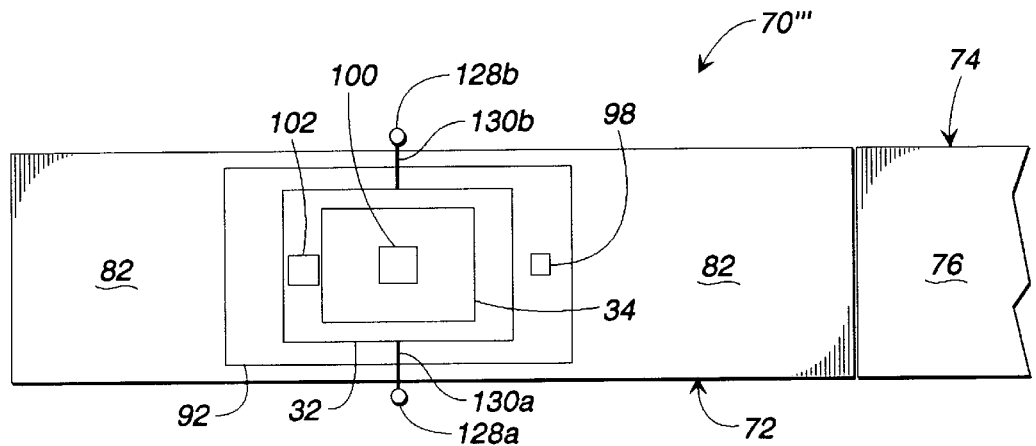
FIG. 11 is a schematic top view of the imaging system of FIG. 10.

FIG. 10 is a schematic side view of an imaging system 70''' that carries out image subtraction and warpage analysis in accordance with a fourth exemplary embodiment of the present invention. FIG. 11 is a schematic top view of the imaging system 70''' of the third exemplary embodiment, wherein only the peripheries of select components of the imaging system 70''' are shown so that the relative positions of those components can generally be discerned. In addition to the elements of the first exemplary embodiment (FIGS. 3–5), the imaging system 70''' includes an electromechanical assembly for raising and lowering the grating 32. In a first position, the grating 32 is generally parallel to the top of the conveyer belt 82 as discussed above. In a second position, the grating 32 is also generally parallel to the top of the conveyer belt 82, but the grating 32 is farther from the conveyer belt 82 than it is in the first position.

The electromechanical assembly for raising and lowering the grating 32 includes electric solenoids 128a,b that are attached to the support frame 78. Arms 130a,b are connected between each solenoid 128a,b, respectively, and the grating 32. The computer assembly 104 controls the operation of the solenoids 128. When the solenoids 128a,b are energized, their cores move, and the motion of the cores is transferred to the grating 32 by the arms 130. The solenoids 128 push the grating 32 up against an upper mechanical stop when energized. When the electrical power to the solenoids 128 is removed, gravity brings the grating 32 down to a lower mechanical stop. The distance between the lower and upper stops is 0.005 inches in the fourth exemplary embodiment.

In the fourth exemplary embodiment of the present invention, two images of the printed circuit board 34 being examined are captured in close succession as the printed circuit board 34 passes below the grating 32. In the first image, the grating 32 is in its lower position and the image includes a shadow moiré fringe pattern (e.g., the shadow moiré fringe pattern 54 (FIG. 2)) of the printed circuit board. After the first image is acquired, the computer assembly 104 sends an electrical signal that causes the solenoids 128 to be energized. As a result, the grating 32 is raised to its upper position. A second image is acquired with the grating 32 in the upper position, then the grating 32 is returned to its original (i.e., lower) position. The shadow moiré fringe pattern of the second image is "identical," but reversed in polarity from the first image. That is, if the first image included a shadow moiré fringe pattern like the shadow moiré fringe pattern 54 of FIG. 2, the second image would include a shadow moiré fringe pattern shaped like the shadow moiré fringe pattern 54 of FIG. 2, but in the second image the moiré half-fringes 56 that are black in FIG. 2 would be white, and the moiré half-fringes that are white in FIG. 2 would be black. The computer assembly 104 digitizes both images and arithmetically combines the two images, producing a resulting image which includes a shadow moiré fringe pattern of the first image with greatly reduced interference from the optical features on the surface of the printed circuit bard 34 being examined. More particularly, the computer assembly 104 performs a matrix subtraction on the two images, producing a resulting image which shows the shadow moiré fringe pattern with greatly reduced interference from the optical features on the surface of the printed circuit bard 34 being examined. The resulting image is analyzed for warpage.

In accordance with the fourth exemplary embodiment of the present invention, the distance the grating 32 travels between its upper and lower position is approximately equal to the following, $$\text{Grating Travel (mils)} = \frac{0.5 \times \text{Grating Pitch (mils)}}{\tan(\text{angle } A) + \tan(\text{angle } B)}$$

wherein the angle A is the angle of incidence of the light emitted from the light source 102 upon the grating 32 and the printed circuit board 34 being examined, and wherein the angle B is the angle of incidence from which the detector 100 views the grating 32 and the printed circuit board 34 being examined. As depicted in FIGS. 10 and 11, the angle B is equal to approximately zero, and the angle A is equal to approximately forty-five degrees (for example, see angle A in FIG. 1).

Figure 12:
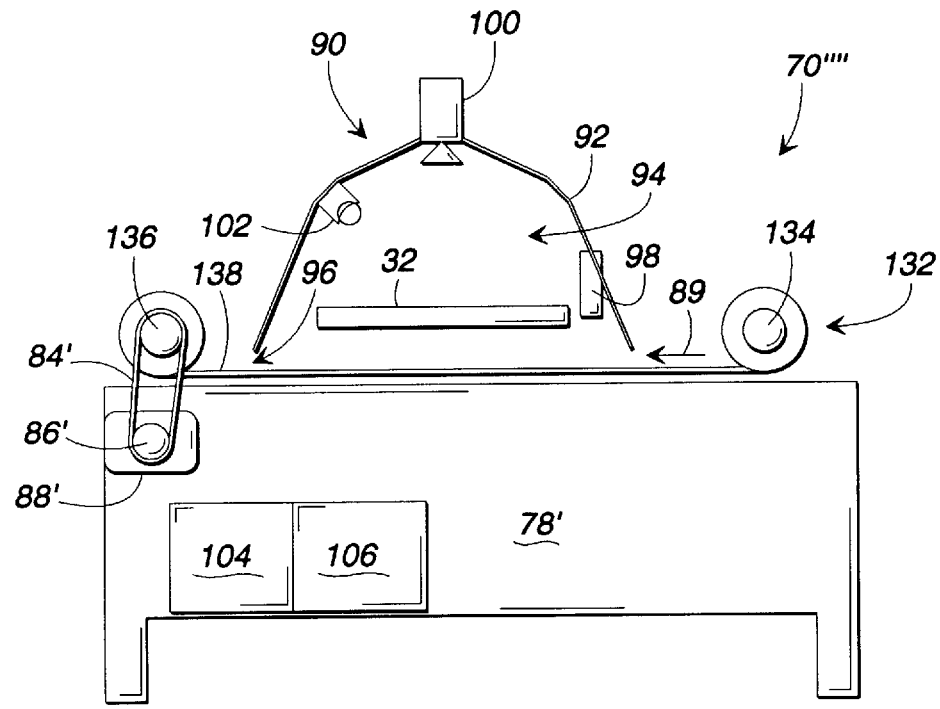
FIG. 12 is a schematic side view of a shadow moiré imaging system in accordance with a fifth exemplary embodiment of the present invention.
Figure 13:
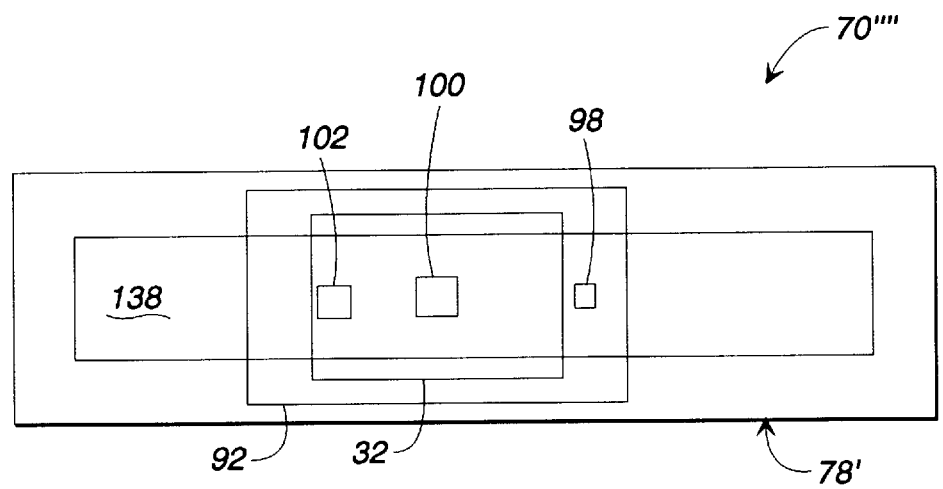
FIG. 13 is a schematic top view of the imaging system of FIG. 12.

FIG. 12 is a schematic side view of an imaging system 70"" in accordance with a fifth exemplary embodiment of the present invention. FIG. 13 is a schematic top view of the imaging system 70"" of the fifth exemplary embodiment, wherein only the peripheries of select components of the imaging system 70"" are shown so that the relative positions of those components can generally be discerned. The imaging system 70"" of the fifth exemplary embodiment varies from the imaging system 70 (FIGS. 3–5) of the first exemplary embodiment because its conveyer assembly is in the form of a reel-to-reel tape transport system 132 that conveys an object to examined which is in the form of an elongate flexible circuit. The reel-to-reel tape transport mechanism 132 includes a reel 134 and a reel 136 between which the elongate flexible circuit 138 extends above a support frame 78'. The reel 136 is driven so that it rotates and conveys the elongate flexible circuit 138 between the reels 134, 136 in the direction indicated by arrow 89. A portion of the elongate flexible circuit 138 is unwound from reel 134 while a portion is wound on reel 136. The reel 136 is driven by way of a drive belt 84' that is driven by a drive motor 88' mounted to the support frame 78. The elongate flexible circuit 138 is preferably in motion while it is being examined (e.g., while each shadow moiré fringe pattern associated with it is created and captured). In accordance with alternate embodiments of the present invention, a reel-to-reel tape transport system 132 is substituted into the imaging systems of the second, third, and fourth exemplary embodiments.

OPERATION

Figure 14:
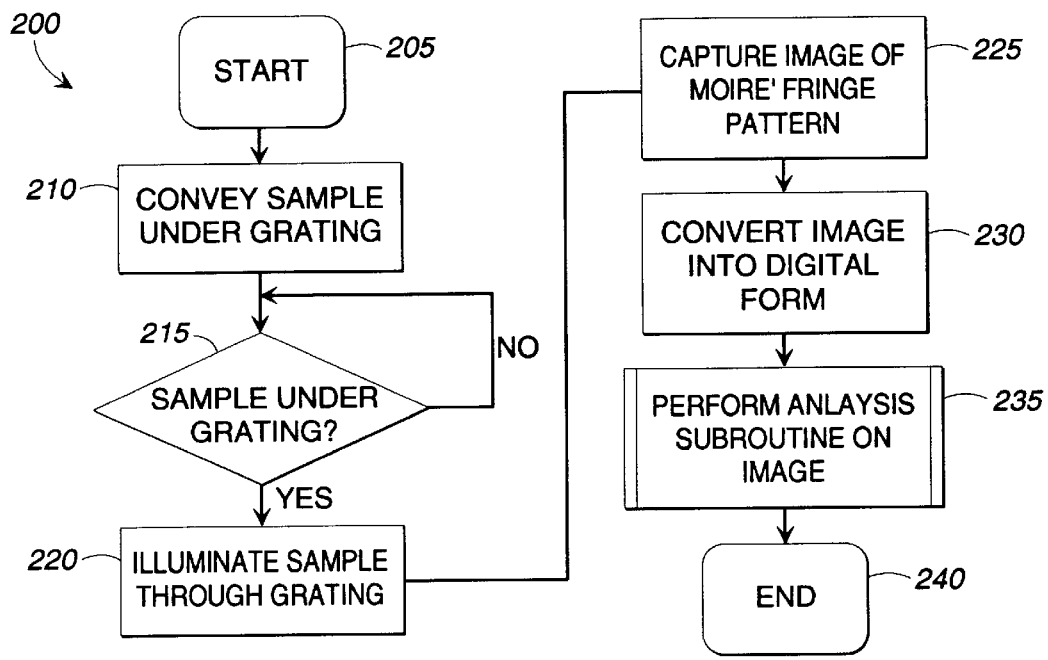
FIG. 14 is a flow diagram illustrating an exemplary method performed in accordance with an embodiment of the present invention.

Turning now to FIG. 14, and referring also to FIGS. 3–5, an exemplary method 200 (FIG. 14) of operation for the imaging system 70 is discussed, in accordance with the first exemplary embodiment of the present invention. The method 200 begins at step 205 and proceeds to step 210. At step 210, the printed circuit board 34 is being conveyed by the conveyor belt 82 such that it will eventually be located under the grating 32 and within the field of view of the detector 100. At step 215, a determination is made as to whether or not the printed circuit board 34 is under the grating 32 and in the field of view of the detector 100. The sensor 98 plays a role with respect to the step 215. The sensor 98 detects a printed circuit board 34 passing thereunder and informs the computer assembly 104 of the presence of the printed circuit board 34. Prior to the arrival of the printed circuit board 34 into the chamber 94 of the imaging subsystem 90, a user will have programmed into the computer assembly 104 the speed at which the top surface of the conveyor belt 82 is moving in the direction 89. Based upon this data, the computer assembly 104 calculates the point in time at which the printed circuit board 34 will be properly positioned under the detector 100, as depicted in FIGS. 3 and 4. Control will be maintained at step 215 until a printed circuit board 34 being examined is detected by the sensor 98 and a proper time delay has occurred so that the printed circuit board 34 is properly positioned, as discussed above. Alternately, a piece of auxiliary equipment 118 (FIG. 5) is incorporated into the imaging system 70 that senses the speed of the conveyor belt 82, and the sensed belt speed is utilized to establish when the circuit board 34 is properly positioned. Alternately, the proper location of the printed circuit board 34 can be determined by the sensor 98 alone, by placing the sensor 98 such that it does not detect the printed circuit board 34 being examined until the printed circuit board 34 being examined is in the proper location.

Once it is determined at step 215 that the printed circuit board 34 is properly positioned under the grating 32, the method 200 proceeds to step 220. At step 220, the light source 102 emits a short pulse of light to create a shadow moiré fringe pattern (e.g., shadow moiré fringe pattern 54 (FIG. 2)) that is indicative of the warpage of the printed circuit board 34 being examined. At approximately the same instant in time that step 220 is completed, step 225 is completed. At step 225, the detector 100 captures the shadow moiré fringe pattern created at step 220. At step 230, the computer assembly 104 converts the image captured at the step 225 into digital form. At step 235 the digital image of step 230 is processed by an analysis subroutine 300 (FIG. 15) that quantifies the warpage of the printed circuit board 34 being examined. After the analysis subroutine 300 is conducted, the method 200 precedes to step 240 which terminates the first iteration of the method 200. Subsequent to step 240, control is transferred back to step 205 and the method 200 is completed for the next printed circuit board 34 that reaches the imaging subsystem 90. In accordance with the first exemplary embodiment of the present invention, a plurality of printed circuit boards 34 are conveyed under the grating 32 in succession. The method 200 is carried out for each successive printed circuit board 34 reaching the imaging subsystem 90.

Figure 15:
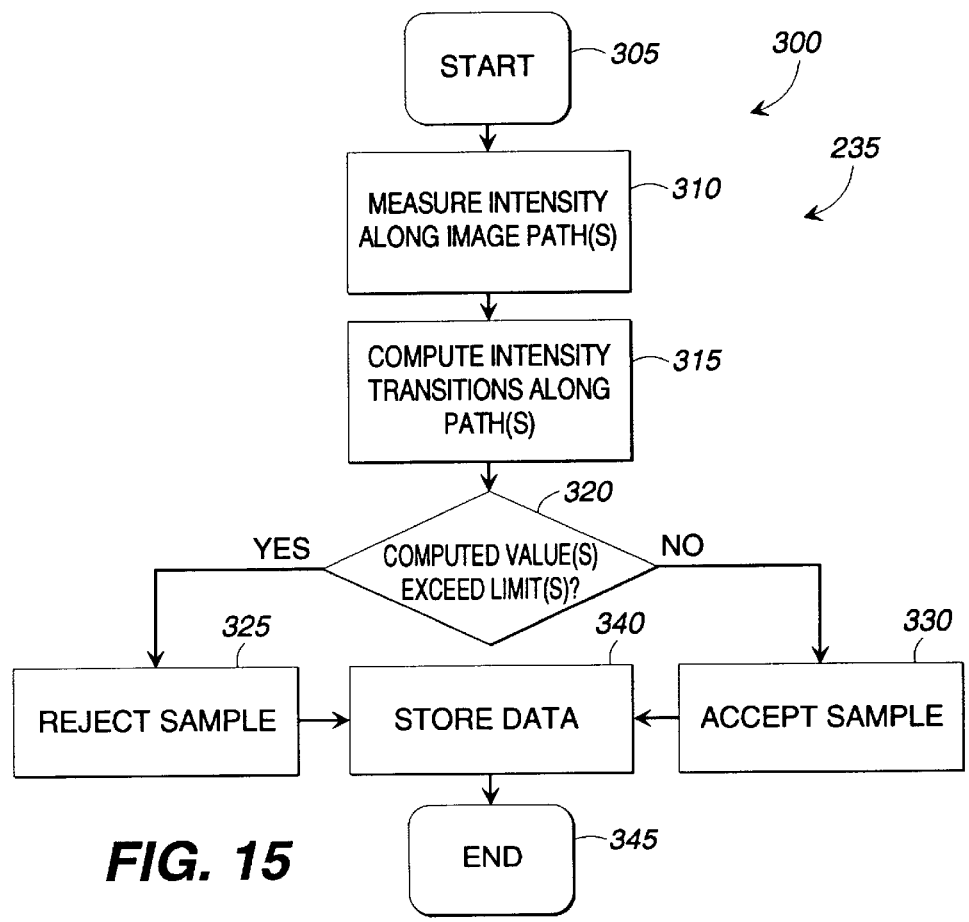
FIG. 15 is a flow diagram illustrating an exemplary method of a subroutine performed in accordance with an embodiment of the present invention.

FIG. 15 is a flow diagram illustrating an exemplary method 300 of the analysis subroutine 300 for quantifying the warpage of a printed circuit board 34. The analysis subroutine 300 is performed by the computer assembly 104 (FIGS. 3 and 5) on a digitized image that includes a shadow moiré fringe pattern (e.g., shadow moiré fringe pattern 54 (FIG. 2)) that is representative of the surface flatness of a printed circuit board 34 being examined. While the analysis subroutine 300 is discussed herein in the context of the first exemplary embodiment of the present invention, as indicated below, the analysis subroutine 300 can also be used by the other embodiments of the present invention. Regarding the analysis subroutine 300, the computer assembly 104 (FIGS. 3 and 5) "scans" the digitized image to determine a quantity relating to the number of moiré half-fringes 56 (FIG. 2) defined in a limited region or limited regions of the image. Only limited regions are "scanned" for the sake of efficiency. The limited regions to be scanned are chosen such that they provide a good indication of the warpage of the printed circuit boards 34 being examined. The quantity relating to the number of moiré half-fringes 56 provides an indication of the flatness of the examined printed circuit board. The elevational difference between a first point on the surface of the printed circuit board 34 being examined and a second point on the surface of the printed circuit board 34 being examined is a function of the number of moiré half-fringes that are defined between those two points.

Figure 16:
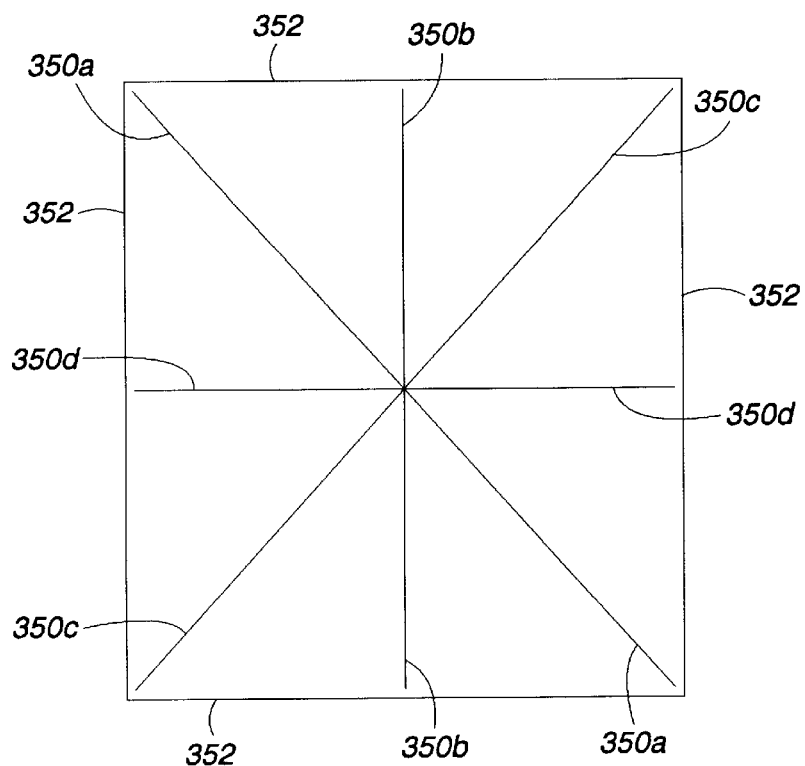
FIG. 16 is an illustration depicting the periphery of a shadow moiré fringe pattern and a plurality of analysis paths across the shadow moiré fringe pattern.

In accordance with the embodiments of the present invention, the computer assembly 104 (FIGS. 3 and 5) "scans" the digitized image along one or more distinct paths that are defined by the user. FIG. 16 is a schematic view outlining the periphery 352 of a shadow moiré fringe pattern (for example see shadow moiré fringe pattern 54 (FIG. 2)) that corresponds to the surface of a printed circuit board 34 being examined. Prior to the method 300, a user has preferably identified a plurality of paths 350 along which the computer assembly 104 "scans" to quantify flatness. A plurality of paths 350a–d are schematically represented in FIG. 16. The paths 350 are preferably dispersed across the image of a printed circuit board 34 being examined. Some or all paths can be set to facilitate measurement of the overall warpage of the printed circuit board 34 being examined. Alternatively, some of the paths can be set to facilitate measurement of the overall warpage of the printed circuit board 34 being examined while other paths are specifically targeted to regions of critical importance, such as where single large components will rest on the printed circuit board 34 being examined.

The paths 350 to be "scanned" for one or a plurality of printed circuit boards 34 to be examined are defined during a calibration procedure which is preferably carried out by a user prior to examining different batches of printed circuit boards 34. In accordance with an exemplary calibration procedure, an image (i.e., a calibration image) of a printed circuit board of the size and type that is to be examined is captured by an imaging subsystem (e.g., one of the imaging subsystems 90 of an exemplary embodiment of the present invention). For purposes of calibration, it is not necessary that the printed circuit board 34 being used for calibration be planar. However, the printed circuit board 34 being used for calibration should be the same size as the actual printed circuit boards 34 to be examined. Also, the printed circuit board 34 being used for calibration should be oriented generally in the same manner that the printed circuit boards 34 to be examined will be oriented. Using, for example, "FRAMEWORK" software, one or more analysis paths 350 are drawn on the calibration image, covering those regions of the printed circuit board over which warpage checking is desired. The calibration image, which includes the paths 350 drawn thereon is stored in memory 112 (FIG. 5). An example of a collection of paths 350 is shown in FIG. 16.

Referring again to the analysis subroutine 300 of FIG. 15, it is carried out by the computer assembly 104. The method 300 begins at step 305 and proceeds to step 310. At step 310, a moiré fringe pattern (e.g., moiré fringe pattern 54 (FIG. 2)) that has been digitized by the computer assembly 104 is operated upon. At step 310, the pattern defined by the plurality of paths 350 in FIG. 16 is retrieved from memory 112 (FIG. 5) and superimposed on the shadow moiré fringe pattern that is being evaluated by the method 300. To achieve proper superimposition, the image of the shadow moiré fringe pattern that is being evaluated will be rotated by the computer assembly 104 if necessary. Such rotation will be necessary depending upon the orientation of the printed circuit board 34 being examined. At step 310, a plurality of intensity measurements are taken along each of the paths 350.

At step 315, intensity transitions along each of the paths 350 (FIG. 16) are calculated. The intensity transitions are acceptably calculated by utilizing known feature counting techniques. Those techniques are also known as straight-line thresholding using transition detection. In accordance with the exemplary embodiments of the present invention, the intensity transitions are determined by the FeatureCount module, which is part of the "FRAMEWORK" software of the Series 820 optical sensor system from Dickerson Vision Technologies (Atlanta, Ga.).

Figure 17:
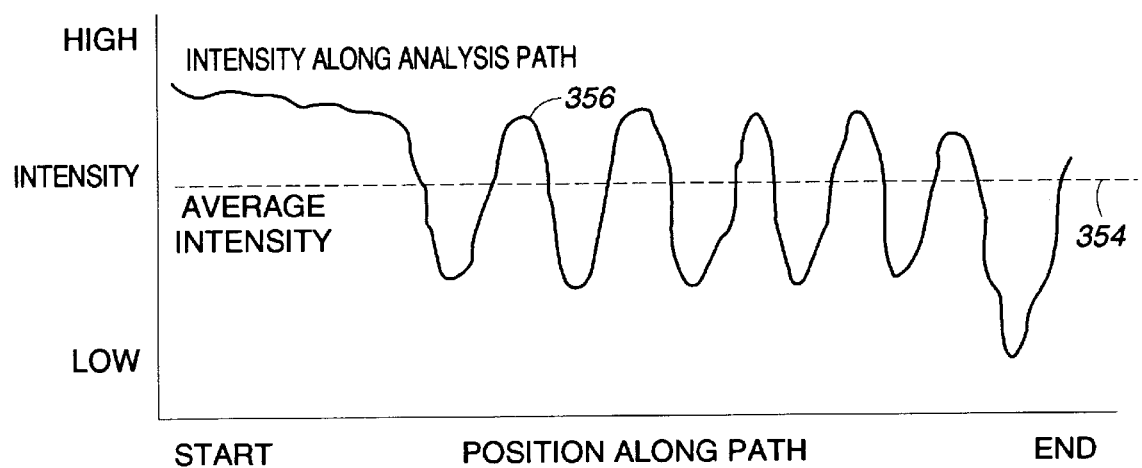
FIG. 17 is a graphical illustration depicting the manner in which intensity transitions along a representative analysis path of FIG. 16 are determined.

FIG. 17 is a graphical representation of the manner in which intensity transitions along a representative analysis path of the analysis paths 350 are determined. The line 356 represents the variation in light intensity encountered when traveling along the representative analysis path. A threshold intensity is calculated, which is represented by the dashed line 354 in FIG. 17. The threshold intensity is preferably a value between the maximum and minimum intensities of the curve 356 and is typically set by the user during the test design process (i.e., during an initial setup) to maximize the ability to detect all half-fringes and minimize the detection of noise.

During normal operation, for a representative path of the paths 350, the computer assembly 104 "plots" a series of points (i.e., an intensity curve 356) which represent the intensity at each pixel along the representative path, calculates and "plots" the threshold intensity line 354 between the maximum and minimum intensities of the curve 356, and calculates the number of times the intensity curve 356 crosses the threshold intensity line 354. Stated differently, each time the representative path crosses from a light region to a dark region (or, alternatively, from a dark region to a light region) in the shadow moiré fringe pattern (e.g., moiré fringe pattern 54 (FIG. 2)) being examined, the computer assembly 104 detects and counts that transition as a moiré half-fringe. The computer assembly 104 completes the foregoing and sums (i.e., adds up) the number of half-fringes for each analysis path 350.

In accordance with the exemplary calibration procedure, discussed in part above with respect to the establishment of the analysis paths 350 (FIG. 16), a user additionally identifies threshold values. The threshold values correspond to a maximum number of half-fringes (i.e., light-to-dark transitions and visa-versa) that are allowed along each analysis path 350. In accordance with the exemplary embodiments of the present invention, the maximum number of fringes for each analysis path 350 is equal to the length of the path (in inches), multiplied by the grating resolution (in lines per inch), multiplied by the allowable warpage (in %), divided by one hundred. Allowable warpage specifications for printed circuit boards are generally expressed as a maximum percentage, equal to the maximum vertical distortion from planarity allowed divided by the distance between two opposite corners of the sample. Typical warpage specifications in the industry today are 1%, 0.7%, and 0.4%. For example, assuming that the length of a path is 4 inches, the grating resolution is 100 lines per inch, and the allowable warpage is 1%, the maximum number of fringes that would be allowed along that path would be 4×100×1÷100=4 fringes. The maximum number of fringes can be entered into the "FRAMEWORK" software individually for each path 350. The path 350 positions and maximum number of fringes are preferably stored in memory 112 (FIG. 5).

At step 320, the user-defined threshold values are retrieved from memory 112 (FIG. 5) and intensity transitions computed at step 315 are compared to the threshold values. If any of the computed values exceed their respective threshold value, control is transferred to step 325. That is, if any one of the analysis paths 350 is found to have a number of fringes that exceeds the acceptable number for that path 350, control is transferred to step 325. At step 325, the fact that the printed circuit board 34 (FIGS. 3 and 4) being examined is more warped than acceptable is signaled by the illumination of the light 120 (FIG. 5). Alternatively, rather than or in addition to illuminating the light source 120, the computer assembly 104 (FIGS. 3 and 5) can generate a signal that causes the defective printed circuit board 34 to be marked "unsatisfactory," or causes the defective printed circuit board 34 to be pushed off of the conveyor belt 82 (FIGS. 3 and 4) and into a bin containing rejected printed circuit boards.

If the computed intensity transitions for the printed circuit board 34 (FIGS. 3 and 4) are acceptable, step 320 transfers control to step 330. At step 330, an acceptance signal is generated by the computer assembly 104 (FIGS. 3 and 5) such that the light 120 (FIG. 5) is extinguished. Alternatively, at step 330 the printed circuit board 34 can be marked as "passing." After both of the steps 325 and 330, control is transferred to step 340 where data collected for the printed circuit board 34 being examined is stored in memory 112 (FIG. 5) so that it can be accessed later for trending purposes. Trending can be carried out, for example, to provide an indication as to whether or not surface flatness along individual paths 350 (FIG. 16) is deteriorating for a group of printed circuit boards 34. This information can be used for preventative maintenance purposes. At step 345, the method 300 ends.

Figure 18:
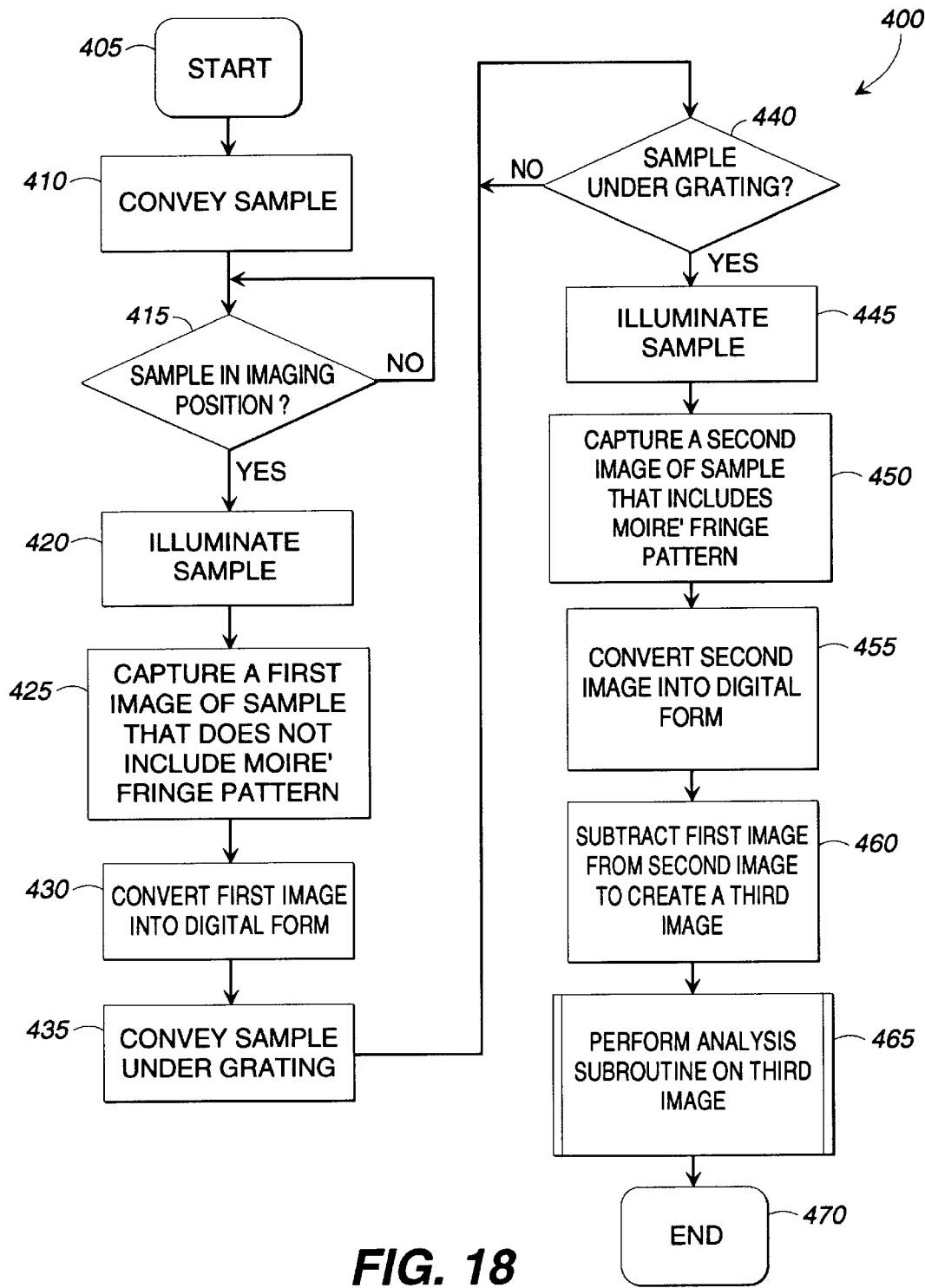
FIG. 18 is a flow diagram illustrating an exemplary method performed by the embodiment of the imaging system of FIG. 6.

FIG. 18 is a flow diagram illustrating an exemplary method 400 by which the imaging system 70' (FIGS. 6 and 7) operates in accordance with the second exemplary embodiment of the present invention. The method 400 begins at step 405 and proceeds to step 410. Referring also to FIGS. 6 and 7, at step 410, the printed circuit board 34a is being conveyed by the conveyor belt 82. At step 415, a determination is made as to whether or not the sensor 98b has sensed the printed circuit board 34a and a sufficient time delay has occurred such that the printed circuit board 34a is within the desired field of view of the detector 100b. Upon an affirmative determination at step 415, control is transferred to step 400. At step 420, the light source 102b emits a flash of light and at step 425 the detector 100b captures an image of the printed circuit board 34a. The image captured at step 425 does not include a shadow moiré fringe pattern (e.g., shadow moiré fringe pattern 54 (FIG. 2)). The image of step 425 is converted into digital form by the computer assembly 104 at step 430. At step 435, the printed circuit board 34a continues to be conveyed towards the grating 32.

At step 440, a determination is made as to whether or not the sensor 98a has detected the printed circuit board 34a and a time delay has passed such that the printed circuit board 34a is properly oriented under the grating 32 and within the field of view of the detector 100a. Upon an affirmative determination at step 440, control is transferred to step 445. At step 445, the light source 102a emits a flash of light onto the printed circuit board 34a through the grating 32 to create a shadow moiré fringe pattern (e.g., see shadow moiré fringe pattern 54 of FIG. 2) that is captured by the detector 100a at step 450. At step 455, the image that was captured at step 450 is converted into digital form by the computer assembly 104. At step 460, the image digitized at step 430 is subtracted from the image digitized at step 455 to create a third and enhanced image of a shadow moiré fringe pattern (i.e., the images are arithmetically combined, or more particularly image subtraction is carried out on the images, as discussed above). The modified "FRAMEWORK" software package utilized by the present invention includes a subtraction module that carries out the image subtraction. At step 465, the analysis subroutine 300 (FIG. 15) is carried out on the image created at step 460. At step 470, the method 400 terminates. In accordance with the second exemplary embodiment of the present invention, a plurality of printed circuit boards 34 are conveyed under the grating 32 in succession. The method 400 is carried out successively for each printed circuit board 34 that passes through the imaging system 70'.

Figure 19:
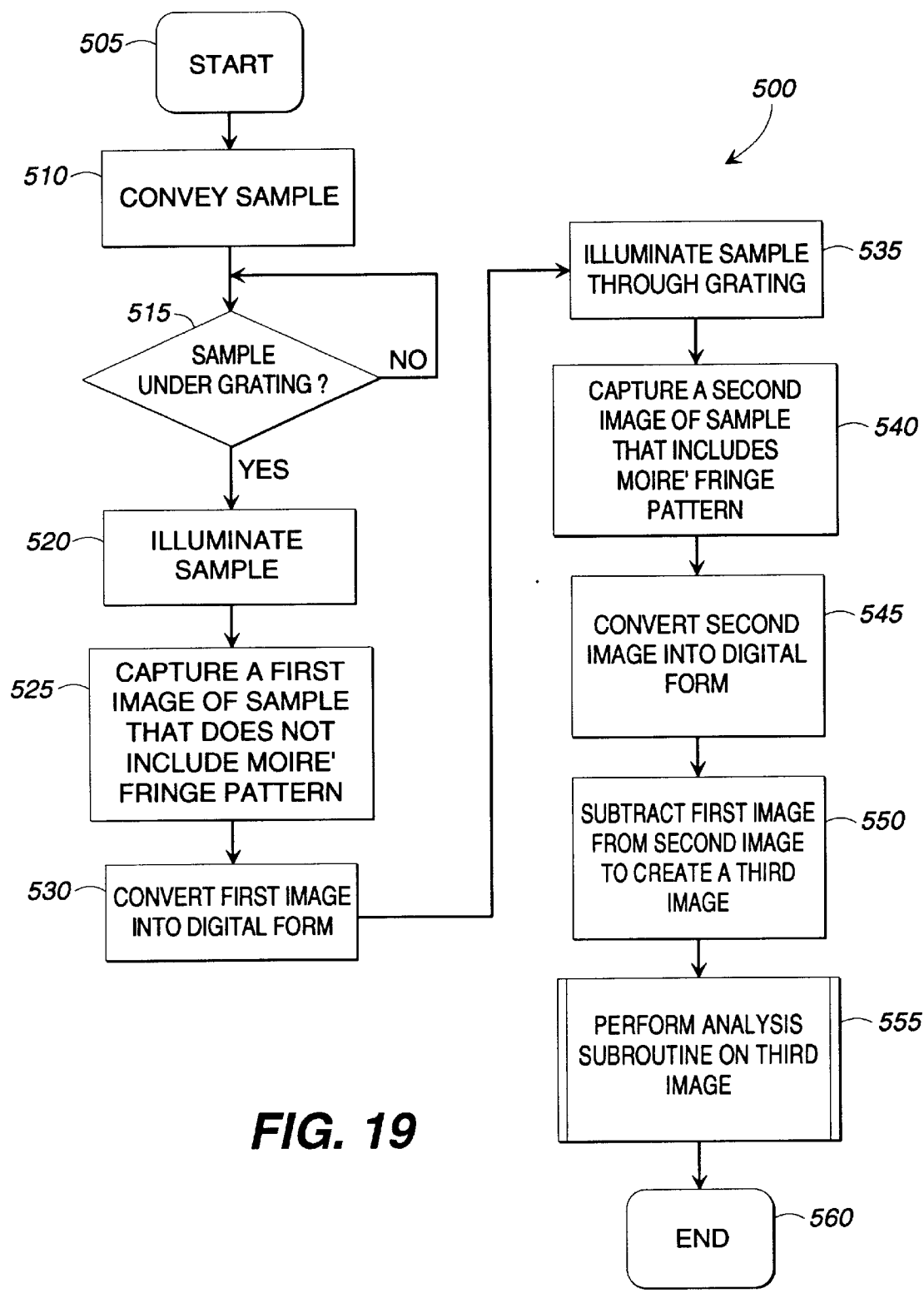
FIG. 19 is a flow diagram illustrating an exemplary method performed by the embodiment of the imaging system of FIG. 8.

FIG. 19 is a flow diagram illustrating an exemplary method 500 of operation for the imaging system 70" (FIGS. 8 and 9) in accordance with the third exemplary embodiment of the present invention. The method 500 begins at step 505 and proceeds to step 510. Referring also to FIGS. 8 and 9, at step 510, the conveyor belt 82 is conveying the printed circuit board 34 to be examined toward the imaging subsystem 90'. At step 515, a determination is made as to whether or not the printed circuit board 34 has passed underneath the sensor 98 and a sufficient amount of time has passed such that the printed circuit board 34 is properly positioned below the grating 32 and within the field of view of the detector 100. Upon an affirmative determination at step 515, control is transferred to step 520. At step 520, the light source 102 emits a flash of light that illuminates the printed circuit board 34 through the grating 32, but due to the arrangement of the light source 126, a shadow moiré fringe pattern (e.g., see shadow moiré fringe pattern 54 of FIG. 2) is not formed. At approximately the same moment that step 520 is carried out, step 525 is carried out and the detector 100 captures an image of the printed circuit board 34 through the grating 32. At step 530, the image of step 525 is digitized by the computer assembly 104. At step 535, the printed circuit board 34 is illuminated by a flash of light from the light source 102 through the grating 32 to create a shadow moiré fringe pattern (e.g., shadow moiré fringe pattern 54 (FIG. 2)). At step 540, the detector 100 captures the shadow moiré fringe pattern created at step 535. Each of the steps 520 through 540 are carried out in very close succession. At step 545, the computer assembly 104, digitizes the image of step 540. At step 550, the computer assembly 104 subtracts the image digitized at step 530 from the image digitized at the step 545 to create an enhanced shadow moiré fringe pattern (i.e., the images are arithmetically combined, or more particularly image subtraction is carried out on the images, as discussed above). At step 555, the analysis subroutine 300 (FIG. 15) is performed on the image created at step 550. At step 560, the method 500 is terminated. In accordance with the third exemplary embodiment of the present invention, a plurality of printed circuit boards 34 are conveyed under the grating 32 in succession. The method 500 is performed for each successive printed circuit board 34 that passes on the conveyor belt 82.

Figure 20:
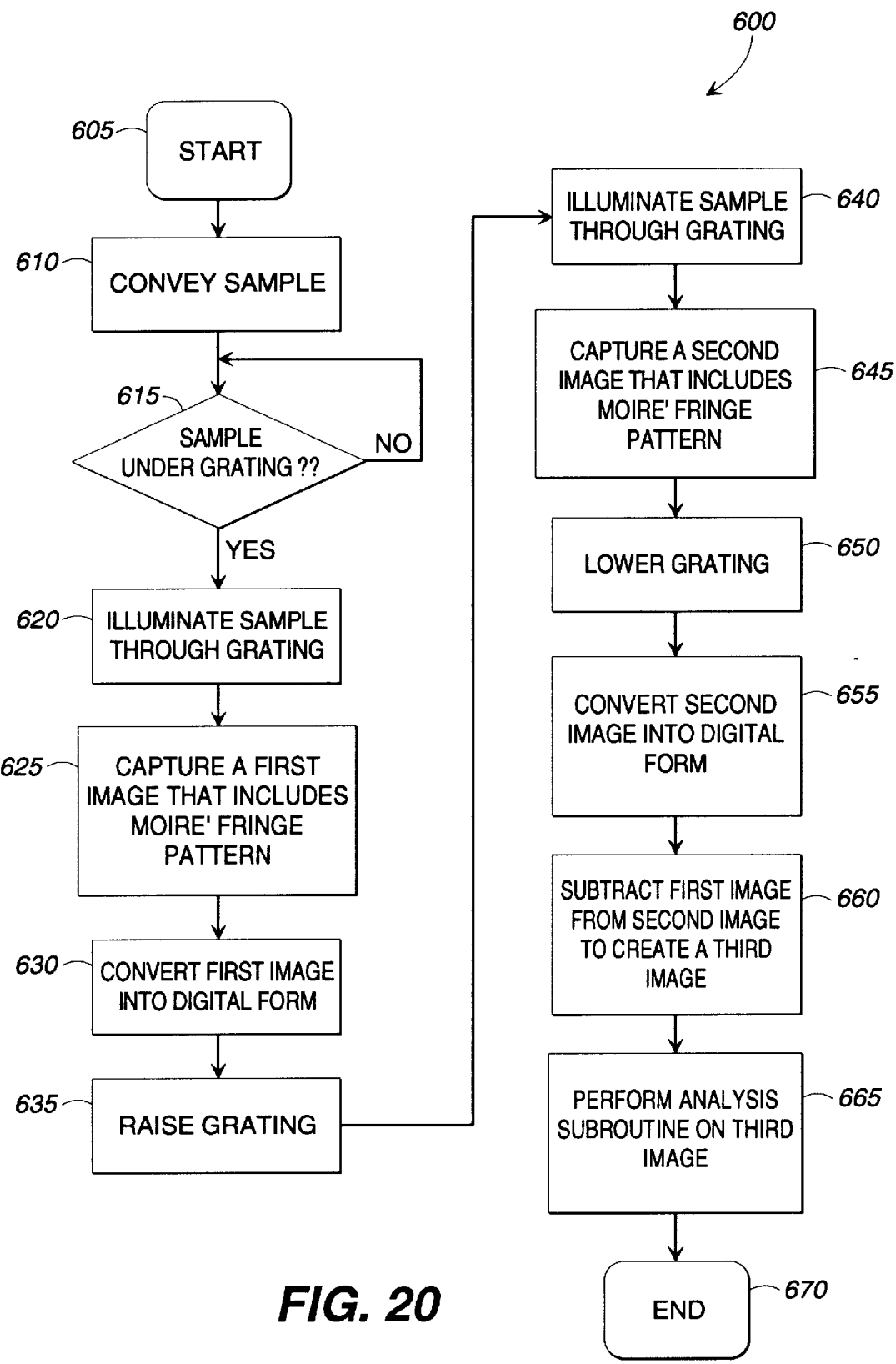
FIG. 20 is a flow diagram illustrating an exemplary method performed by the embodiment of the imaging system of FIG. 10.

FIG. 20 is a flow diagram illustrating an exemplary method 600 of operation for the imaging system 70''' (FIGS. 10 AND 11) of the fourth exemplary embodiment of the present invention. The method begins at step 605 and proceeds to step 610. Referring also to FIGS. 10 and 11, at step 610 a printed circuit board 34 that is to be examined is being conveyed toward the imaging subsystem 90'. At step 615, a determination is made as to whether or not the sensor 98 has sensed the printed circuit board 34 and a sufficient time delay has occurred such that the printed circuit board 34 is properly positioned under the grating 32 and in the field of view of the detector 100. Upon an affirmative determination at step 615, control is transferred to step 620. At step 620, the light source 102 emits a flash of light that illuminates the printed circuit board 34 through the grating 32 to create a shadow moiré fringe pattern (e.g., shadow moiré fringe pattern 54 (FIG. 2)). At step 625, the detector 100 captures an image of the shadow moiré fringe pattern created at step 620. At step 630, the computer assembly 104 converts the image of step 625 into digital form. At step 635, the electric solenoids 128 are operated to raise the grating 32. At step 640, the light source 102 once again emits a flash of light that illuminates the printed circuit board 34 through the grating 32 to create a shadow moiré fringe pattern that is generally identical to the shadow moiré fringe pattern of step 625, except that it is reversed in polarity, as discussed above. At step 645, the detector 100 captures an image of the shadow moiré fringe pattern created at step 640. The steps 620 through 645 are carried out in close succession. The grating 32 is lowered at step 650 and the image of step 645 is digitized by the computer assembly 104 at step 655. At step 660 the image of step 630 is subtracted from the image of step 655 to create an enhanced shadow moiré fringe pattern (i.e., the images are arithmetically combined, or more particularly image subtraction is carried out on the images, as discussed above). At step 665, the analysis subroutine 300 (FIG. 15) is performed on the image of created at step 660. The method 600 terminates at step 670. In accordance with the fourth exemplary embodiment of the present invention, a plurality of printed circuit boards 34 are conveyed under the grating 32 in succession. The method 600 is carried out for each successive printed circuit board 34.

Figure 21:
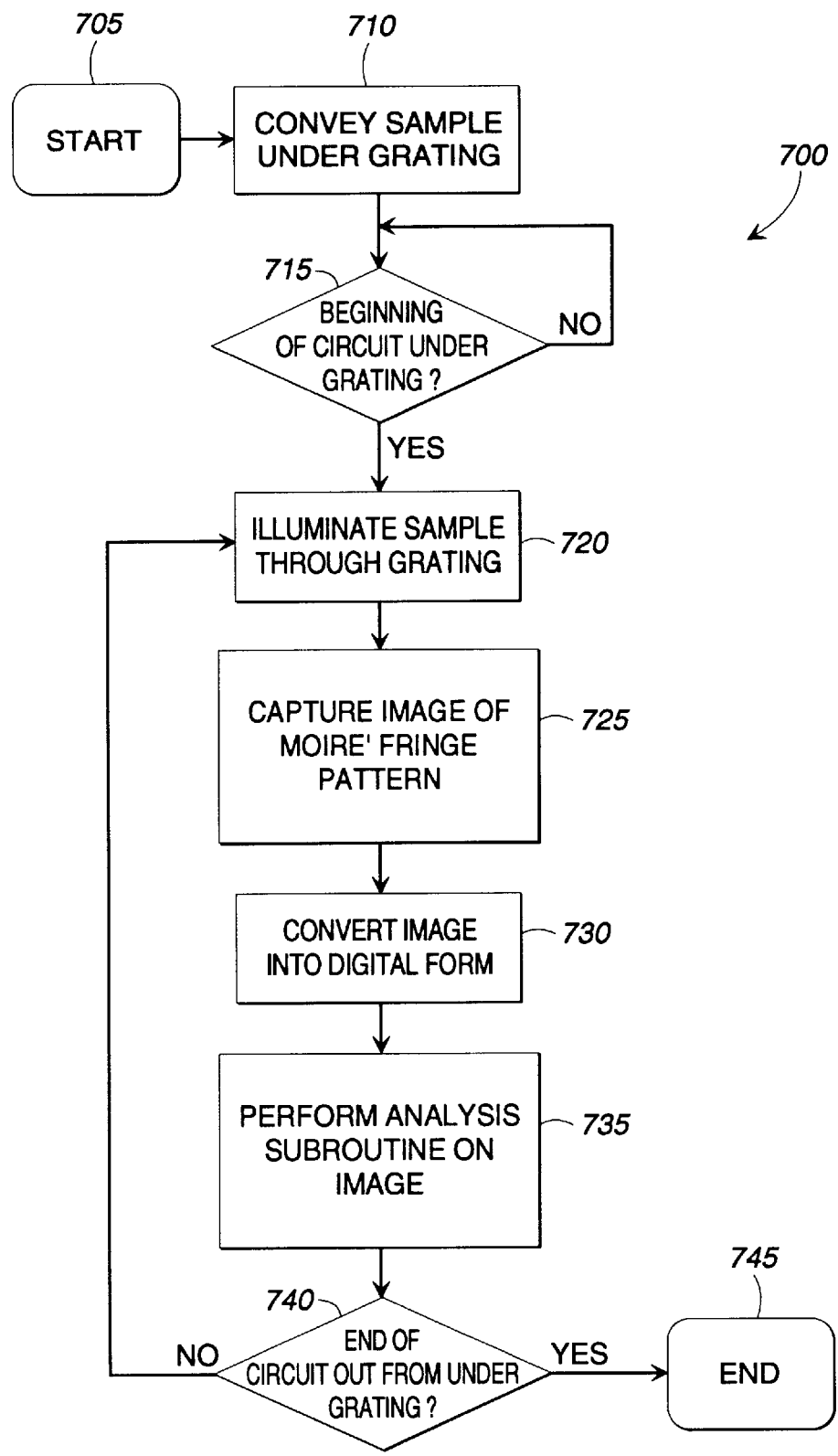
FIG. 21 is a flow diagram illustrating an exemplary method performed by the embodiment of the imaging system of FIG. 12.

FIG. 21 is a flow diagram illustrating an exemplary method 700 of operation for the imaging system 70''' (FIGS. 12 and 13) of the fifth exemplary embodiment of the present invention. The method 700 begins at step 705 and proceeds to step 710. Referring also to FIGS. 12 and 13, at step 710, the reel-to-reel tape transport mechanism 132 is operating so that the elongate flexible circuit 138 is traveling. The method 700 proceeds from step 715 to step 720 after the sensor 98 has detected a marking on the circuit 138 and a time delay has passed such that it is known that a first portion of the circuit 138 is below the grating 32 and within the field of view of the detector 100. At step 720, the light source 102 emits a flash of light that illuminates the circuit 138 through the grating 32 to create a shadow moiré fringe pattern (e.g., shadow moiré fringe pattern 54 (FIG. 2)). At step 725, the detector 100 captures an image of the shadow moiré fringe pattern created at step 720. At step 730, the computer assembly 104 digitizes the image captured at step 725. At step 735, the analysis subroutine 300 (FIG. 15) is carried out on the digitized image of step 730. At step 740, the sensor 198 is queried to determine if the end of the circuit 138 has been reached. If not, the steps 720 through 735 are repeated for the next segment of the circuit 138. When the end of the circuit has been reached, which determination is made at step 740, control is transferred to step 745 and the method 700 is terminated.

In accordance with the exemplary embodiments of the present invention, the printed circuit boards 34 and elongate flexible circuits 138 are moving when the detectors 100 capture images. For each image captured by a detector 100, the respective pulsed light source 102, 126 preferably emits a short pulse of light such that the motion of the circuit board 34 or flexible circuit 138 being imaged is "frozen," so that the movement of the circuit board 34 or flexible circuit 138 has a minimal negative impact upon the captured image (i.e., the detector 100 captures a substantially unblurred image /a substantially clear image).

Throughout the disclosure of the invention, printed circuit boards 34 and elongate flexible circuits 138 should be understood to include, but not necessarily be limited to, electronic interconnection products made from polymers, polymer-fiber composites, metal, ceramic, and combinations of these materials; and such electronic interconnection products in intermediate stages of manufacture (e.g., copper-laminate materials before the copper is patterned into circuit traces).

Those skilled in the art will appreciate that while the present invention is discussed primarily with respect to printed circuit boards 34 and elongate flexible circuits 138, the present invention can be applied to any type of samples for which measurements of surface flatness could be of value. Those skilled in the art will also appreciate that computer code can be written and then executed by the central processing unit 108 (FIG. 5) to carry out the above-described steps and methods. Additionally, as should be understood by those skilled in the art, if any expected input is not received during any one of the above described methods, the method would be terminated.

The present invention has been described in relation to particular embodiments which are intended in all respects to be illustrative rather than restrictive. Alternative embodiments will become apparent to those skilled in the art to which the present invention pertains without departing from its spirit and scope. Accordingly, the scope of the present invention is defined by the appended claims rather than the foregoing description.

We claim:

1. A method for quantifying the surface flatness of an object, comprising the steps of:

conveying the object on a conveyer surface that extends under a grating, wherein the conveyor surface causes the object to travel under the grating;

illuminating at least a portion of the object while the object is under the grating and in the field of view of a detector, to create a shadow moiré fringe pattern;

capturing at least two digitized images, wherein at least a first digitized image of the digitized images is captured by the detector and includes at least the shadow moiré fringe pattern;

digitally combining at least the first digitized image with at least a second digitized image of the digitized images to provide an enhanced shadow moiré fringe pattern image;

determining a quantity that is based upon moiré fringes defined in at least a region of the enhanced shadow moiré pattern image and that provides an indication of the flatness of the surface of the object;

comparing the quantity to a threshold to determine if the object is unacceptably warped; and generating a signal in response to the step of comparing.

2. The method of claim 1, wherein the step of conveying comprises the step of conveying a plurality of objects under the grating in successions, and the steps of creating, determining, comparing, and generating are repeated for each object of the plurality of objects.

3. The method of claim 1, wherein the step of illuminating is automatically responsive to a step of determining that the object is under the grating and in the field of view of the detector, and the step of determining that the object is under the grating comprises sensing the location of the object with a sensor.

4. The method of claim 1, wherein the step of determining a quantity comprises the step of defining a path across at least a portion of the enhanced shadow moiré fringe pattern image and determining a quantity relating to the number of moiré fringes that the path crosses.

5. The method of claim 1, wherein the step of determining a quantity comprises the step of defining a plurality of paths across at least a portion of the enhanced shadow moiré fringe pattern image and determining quantities relating to the number of moiré fringes that paths of the plurality of paths cross.

6. The method of claim 1,
wherein the illuminating step comprises illuminating at least a portion of the object with a pulse of light so that the movement of the object caused by the conveying step has a minimal blurring effect upon the captured image.

7. The method of claim 1,
wherein the first digitized image further comprises features of the object,
wherein the second digitized image comprises features of the object, and
wherein the digitally combining step comprises the step of digitally subtracting the second digitized image from the first digitized image so that at least some of the features of the object included in the first digitized image and the second digitized image are not included in the enhanced shadow moiré pattern image, whereby the shadow moiré fringe pattern is more discernible in the enhanced shadow moiré pattern image than in the first digitized image.

8. The method of claim 1,
wherein the shadow moiré fringe pattern is a first shadow moiré fringe pattern,
wherein the second digitized image comprises a second shadow moiré fringe pattern that is generally reversed in polarity from the first shadow moiré fringe pattern, and
wherein the digitally combining step comprises digitally subtracting the second digitized image from the first digitized image so that the first shadow moiré fringe pattern is more discernible in the enhanced shadow moiré pattern image than in the first digitized image.

9. The method of claim 8,
wherein the method further comprises the step of
moving the grating between a first elevation and a second elevation,
wherein the first digitized image is captured while the grating is at the first elevation, and
wherein the second digitized image is captured while the grating is at the second elevation by steps comprising illuminating the object through the grating to create the second shadow moiré fringe pattern, and
capturing the second shadow moiré fringe pattern with the detector.

10. The method of claim 1, wherein the step of digitally combining comprises digitally subtracting the first digitized image from the second digitized image.

11. A method for quantifying the surface flatness of an elongate object, comprising the steps of:
conveying at least a portion of the elongate object under a grating by winding one end of the object onto a first reel while unwinding the opposite end of the object from a second reel;
illuminating at least a portion of the object while the object is under the grating and in the field of view of a detector, to create a shadow moiré fringe pattern;
capturing at least two digitized images, wherein at least a first digitized image of the digitized images is captured by the detector and includes at least the shadow moiré fringe pattern;
digitally combining at least the first digitized image with at least a second digitized image of the digitized images to provide an enhanced shadow moiré fringe pattern image;
determining a quantity that is based upon moiré fringes defined in at least a region of the enhanced shadow moiré pattern image and that provides an indication of the flatness of the surface of the object;
comparing the quantity to a threshold to determine if the object is unacceptably warped; and
generating a signal in response to the step of comparing.

12. The method of claim 11, wherein the step of determining a quantity comprises the step of defining a path across at least a portion of the enhanced shadow moiré fringe pattern image and determining a quantity relating to the number of moiré fringes that the path crosses.

13. The method of claim 11, wherein the step of determining a quantity comprises the step of defining a plurality of paths across at least a portion of the enhanced shadow moiré fringe pattern and determining quantities relating to the number of moiré fringes that paths of the plurality of paths cross.

14. The method of claim 11, wherein the illuminating step comprises illuminating at least a portion of the object with a pulse of light so that the movement of the object caused by the conveying step has a minimal blurring effect upon the captured image.

15. The method of claim 11,
wherein the first digitized image further comprises features of the object,
wherein the second digitized image comprises features of the object, and
wherein the digitally combining step comprises the step of digitally subtracting the second digitized image from the first digitized image so that at least some of the features of the object included in the first digitized image and the second digitized image are not included in the enhanced shadow moiré pattern image, whereby the shadow moiré fringe pattern is more discernible in the enhanced shadow moiré pattern image than in the first digitized image.

16. The method of claim 11,
wherein the shadow moiré fringe pattern is a first shadow moiré fringe pattern,
wherein the second digitized image comprises a second shadow moiré fringe pattern that is generally reversed in polarity from the first shadow moiré fringe pattern, and
wherein the digitally combining step comprises digitally subtracting the second digitized image from the first digitized image so that the first shadow moiré fringe pattern is more discernible in the enhanced shadow moiré pattern image than in the first digitized image.

17. The method of claim 16,
wherein the method further comprises the step of moving the grating between a first elevation and a second elevation,
wherein the first digitized image is captured while the grating is at the first elevation, and
wherein the second digitized image is captured while the grating is at the second elevation by steps comprising illuminating at least a portion of the object through the grating to create the second shadow moiré fringe pattern, and
capturing the second shadow moiré fringe pattern with the detector.

18. The method of claim 11, wherein the step of digitally combining comprises digitally subtracting the first digitized image from the second digitized image.

19. A system for quantifying the surface flatness of an object, comprising:

a detector;

a grating;

a conveyor surface that extends under said grating and is operative for carrying the object under said grating;

an illumination device operative for illuminating the object while the object is under said grating and in the field of view of said detector, to create a shadow moiré fringe pattern; and means for:
- capturing at least two digitized images, wherein said means comprises said detector and said detector is operable for capturing at least one of the digitized images and that digitized image includes at least the shadow moiré fringe pattern,
- digitally combining at least one of the digitized images with at least another of the digitized images to provide an enhanced shadow moiré fringe pattern image,
- determining a quantity that is based upon moiré fringes defined in at least a region of the enhanced shadow moiré pattern image and that provides an indication of the flatness of the surface of the object,
- comparing the quantity to a threshold to determine if the object is unacceptably warped, and
- generating a signal in response to the comparing.

20. The system of claim 19, further comprising means for moving the grating between a first elevation above said path and a second elevation above said path to create shadow moiré fringe patterns that are generally reversed in polarity.

21. The system of claim 19, further comprising a sensor for sensing an object traveling upon the conveyer and providing an indication of when the object is under the grating and in the field of view of the detector, said illumination device and said detector being responsive to said sensor.

22. The system of claim 19, wherein the object is a printed circuit board.

23. The system of claim 19, wherein said illuminating device comprises a strobe lamp.

24. A system for quantifying the surface flatness of an elongate object, comprising:

a detector;

a grating;

reels upon which the elongate object is wound such that at least a portion of the object is moved under said grating;

an illumination device operative for illuminating at least a portion of the elongate object while the elongate object is under said grating and in the field of view of said detector, to create a shadow moiré fringe pattern; and means for:
- capturing at least two digitized images, wherein said means comprises said detector and said detector is operable for capturing at least one of the digitized images and that digitized image includes at least the shadow moiré fringe pattern,
- digitally combining at least one of the digitized images with at least another of the digitized images to provide an enhanced shadow moiré fringe pattern image,
- determining a quantity that is based upon moiré fringes defined in at least a region of the enhanced shadow moiré pattern image and that provides an indication of the flatness of the surface of the object,
- comparing the quantity to a threshold to determine if the object is unacceptably warped, and
- generating a signal in response to the comparing.

25. The system of claim 24, further comprising means for moving the grating between a first elevation above said path and a second elevation above said path to create shadow moiré fringe patterns that are generally reversed in polarity.

26. The system of claim 24, wherein said illuminating device comprises a strobe lamp.

* * * * *